Jan. 18, 1927.

G. H. GILMAN 1,614,787

MATERIAL HANDLING APPARATUS

Filed May 27, 1920  10 Sheets-Sheet 1

Inventor:
George H. Gilman
Attys.

Jan. 18, 1927.  1,614,787
G. H. GILMAN
MATERIAL HANDLING APPARATUS
Filed May 27, 1920  10 Sheets-Sheet 2

Inventor:
George H. Gilman,
By Emery, Booth, Janney & Varney
Atty.

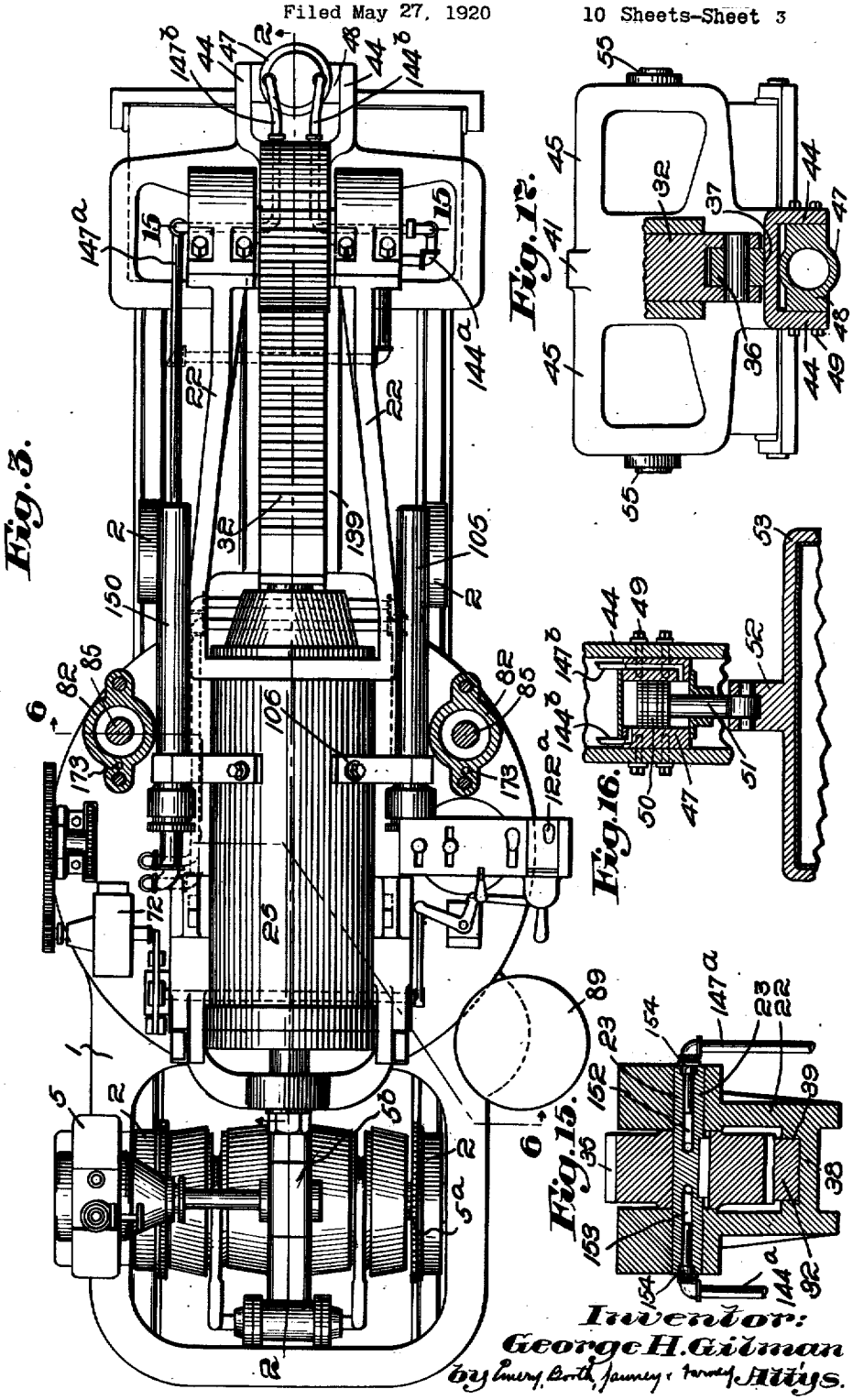

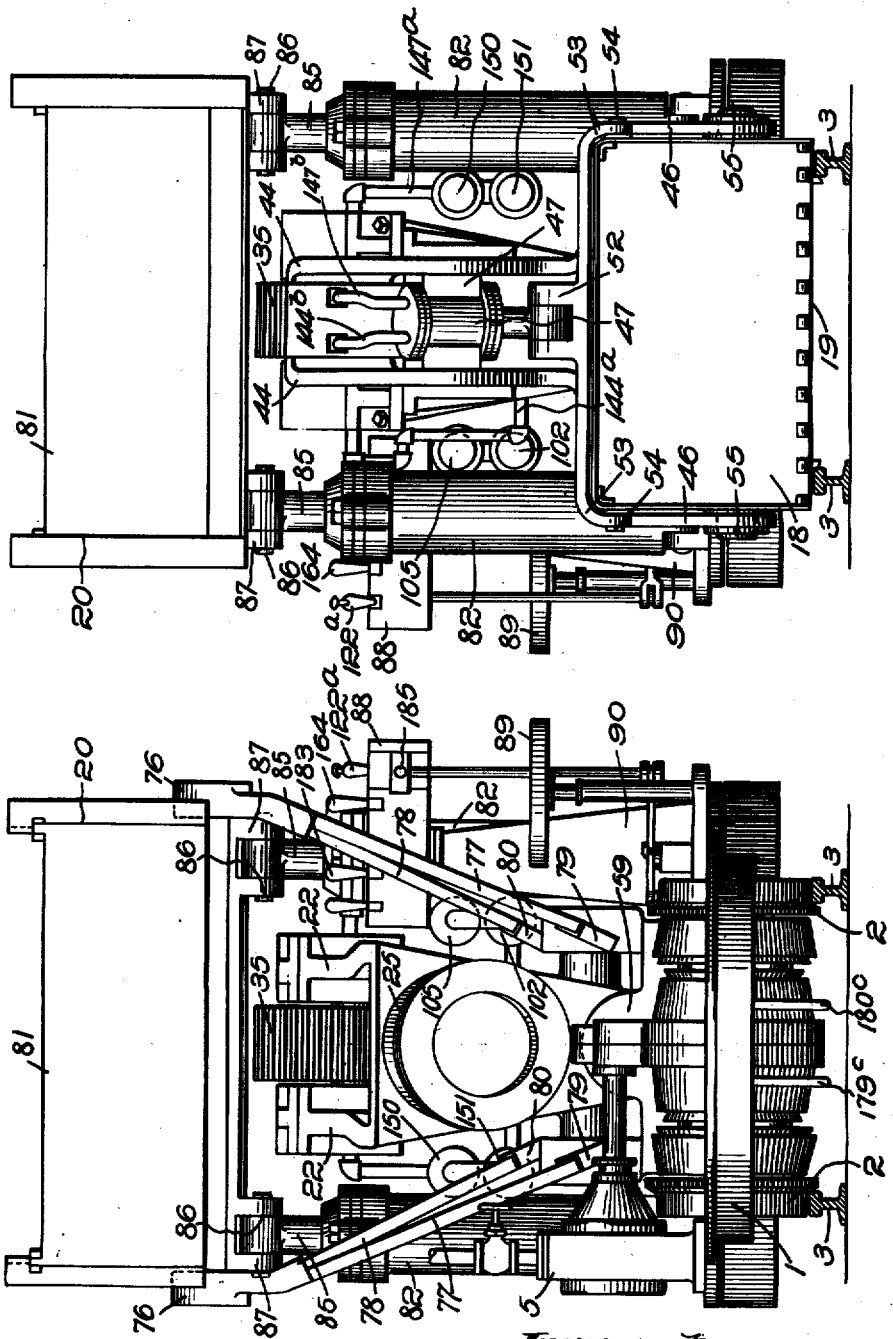

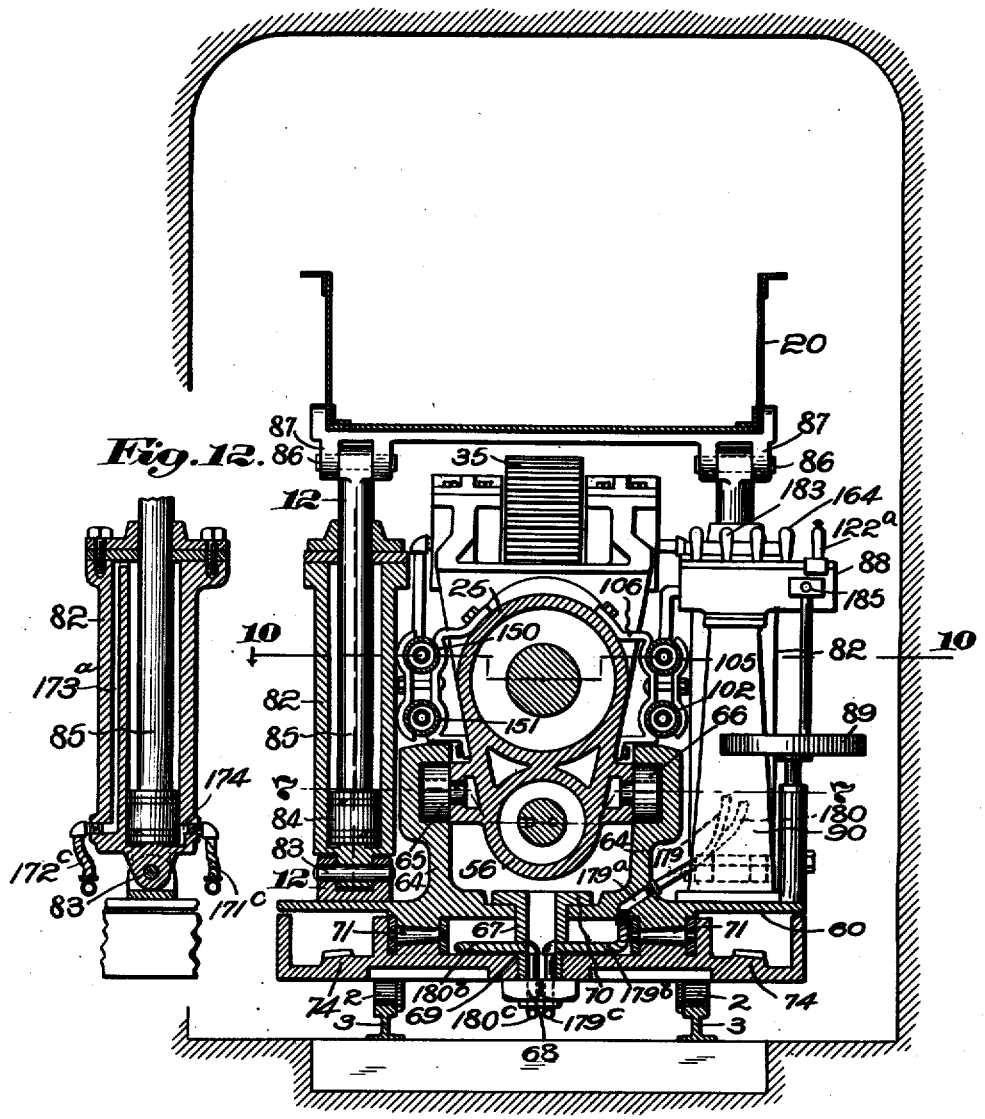

Jan. 18, 1927.
G. H. GILMAN
1,614,787
MATERIAL HANDLING APPARATUS
Filed May 27, 1920    10 Sheets-Sheet 6
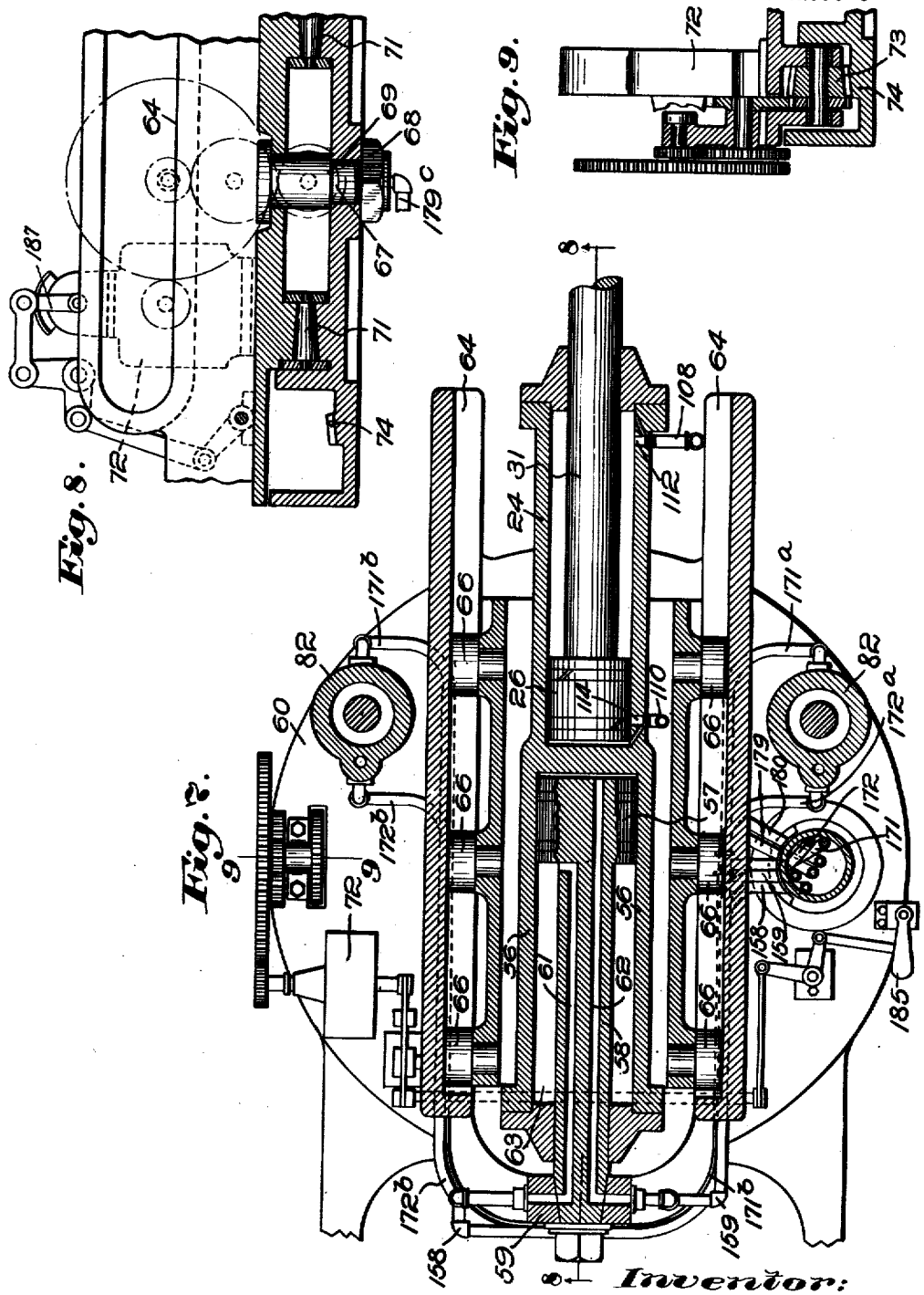
Inventor:
George H. Gilman,
by Emery, Booth, Janney & Varney Attys.

Jan. 18, 1927. 1,614,787
G. H. GILMAN
MATERIAL HANDLING APPARATUS
Filed May 27, 1920 10 Sheets-Sheet 7
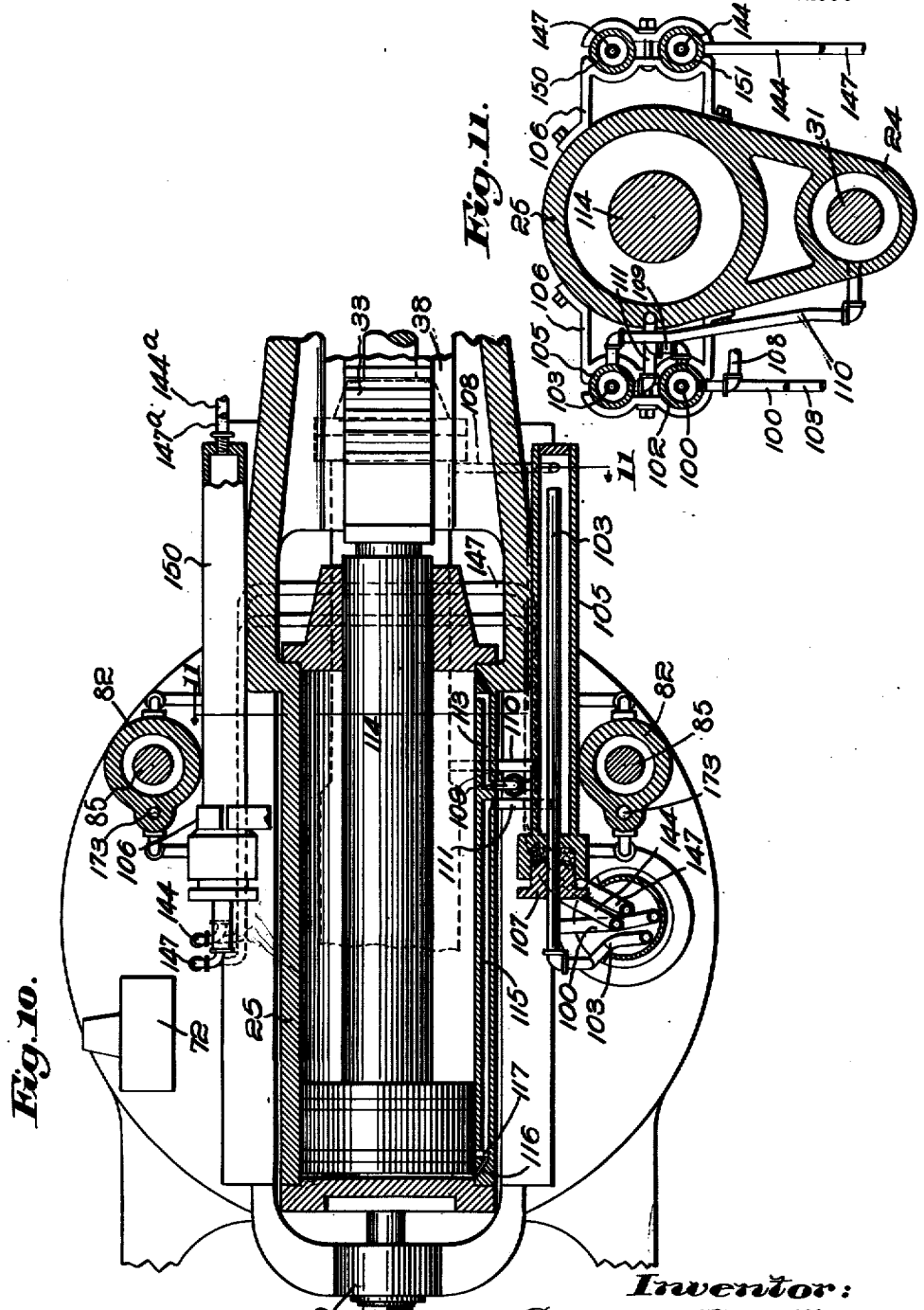
Inventor:
George H. Gilman,
by Emery, Booth, Janney & Varney
Attys

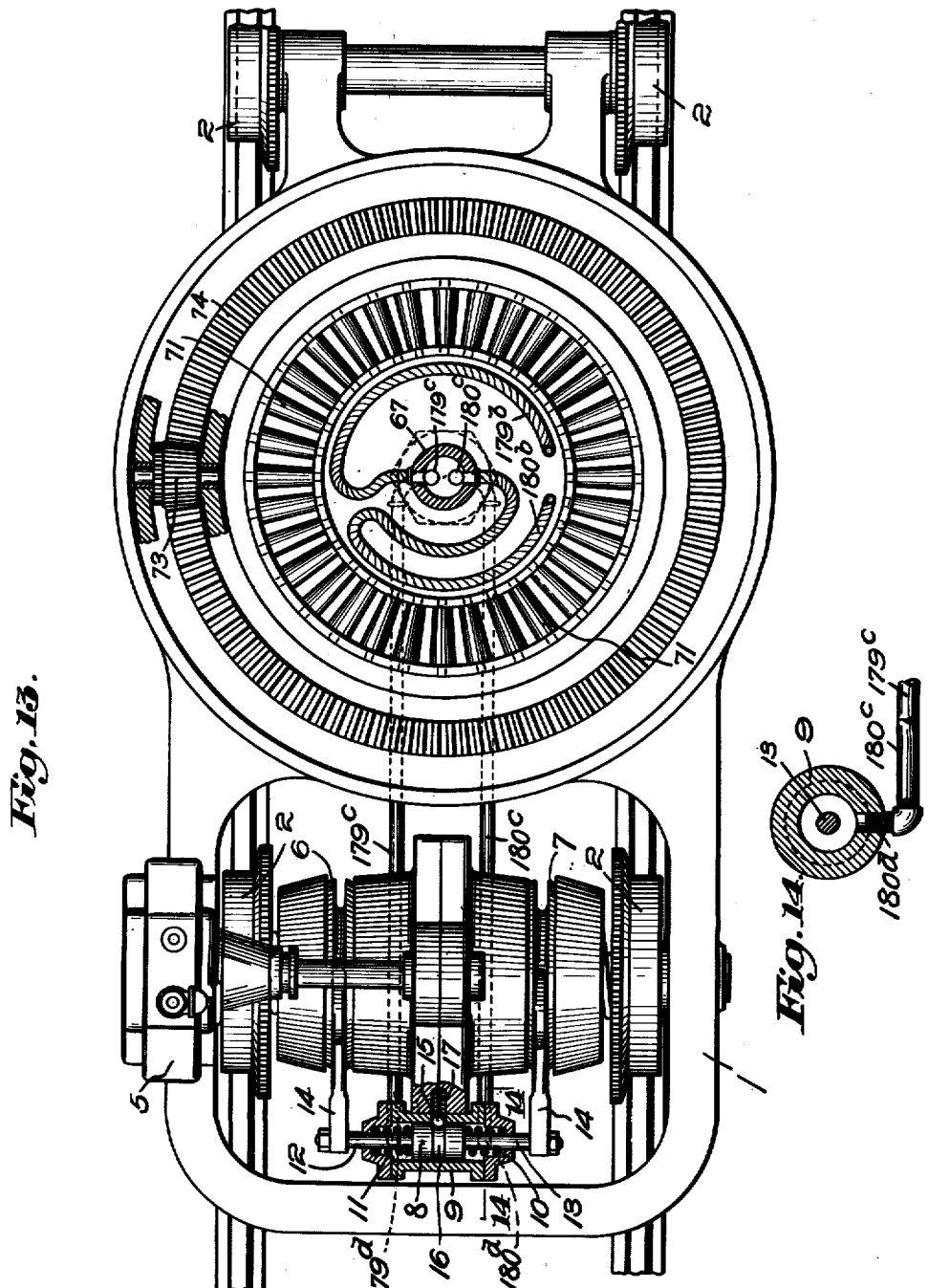

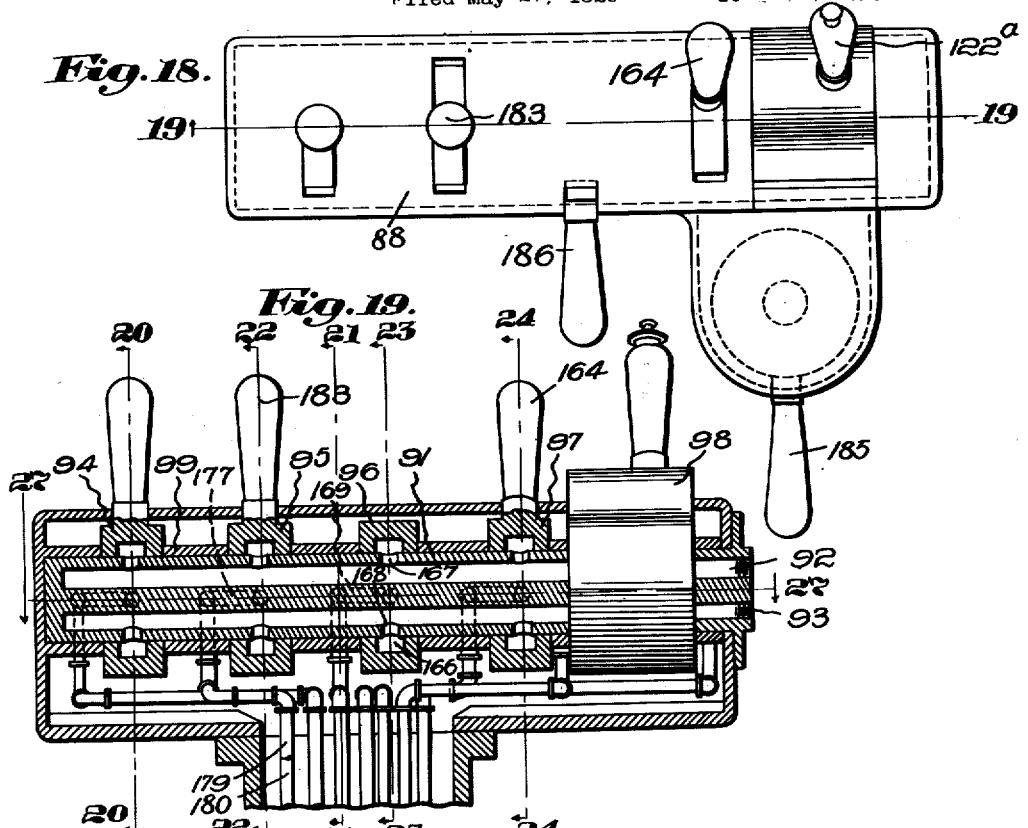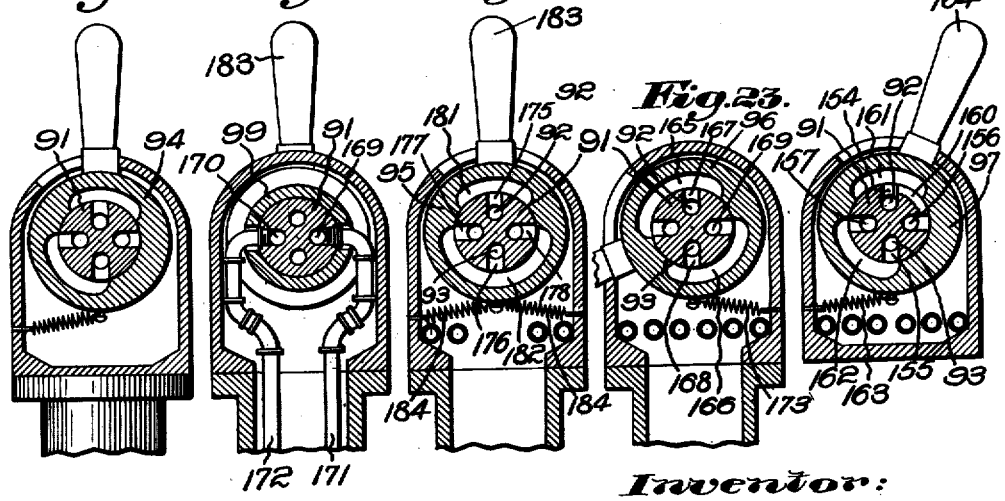

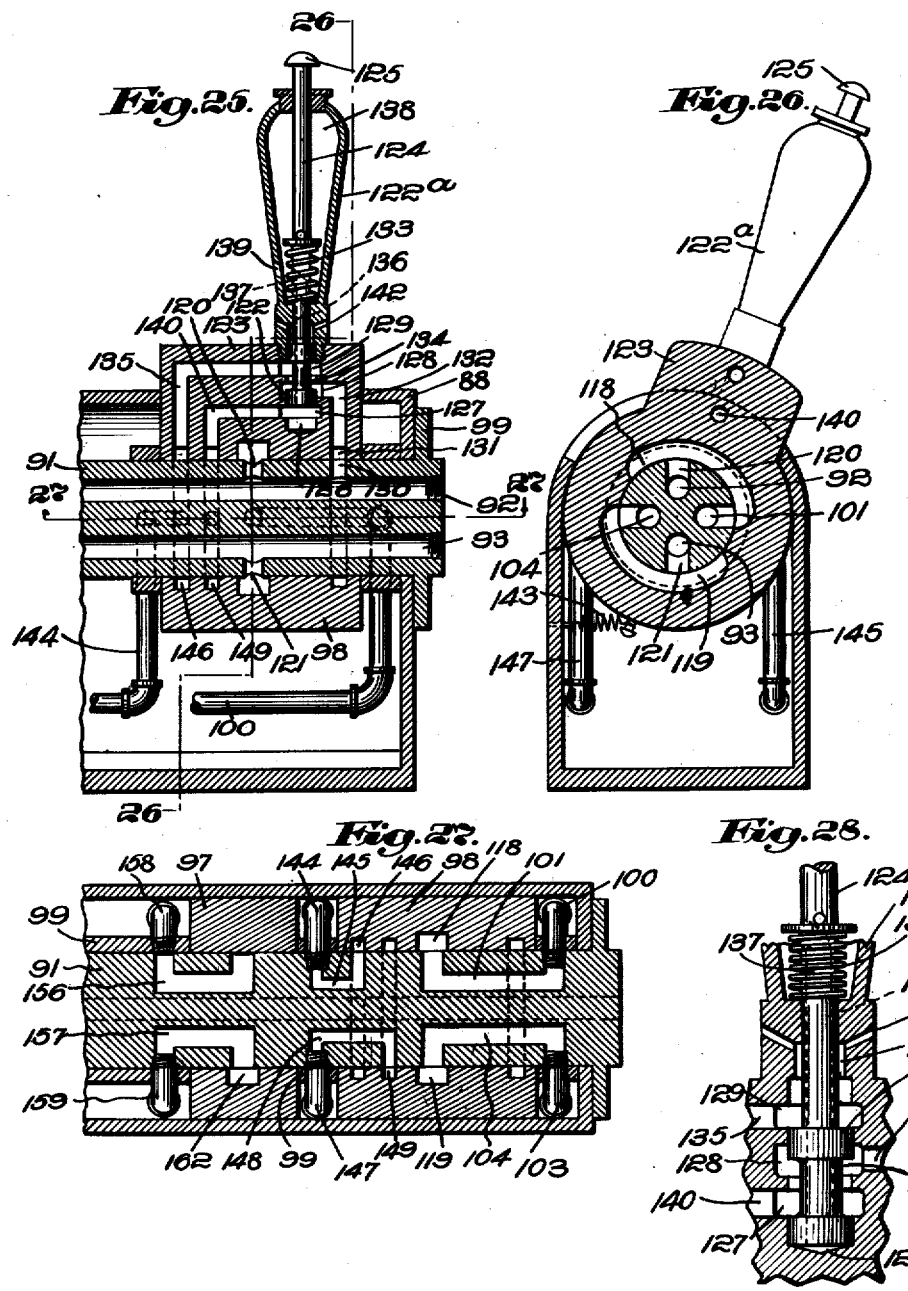

Patented Jan. 18, 1927.

1,614,787

UNITED STATES PATENT OFFICE.

GEORGE H. GILMAN, OF BOSTON, MASSACHUSETTS.

MATERIAL-HANDLING APPARATUS.

Application filed May 27, 1920. Serial No. 384,577.

My invention relates to material handling apparatus and particularly but not exclusively to machines for mucking drifts and among other things concerns a compact and convenient assemblage of the necessary apparatus for operating the various instrumentalities of such a machine.

My invention will be best understood from the accompanying description and drawings showing one specific embodiment of my invention submitted for illustrative purposes, while its scope will be more particularly pointed out in the appended claims.

In the drawings:

Fig. 3 shows a plan of the machine illustrated by Fig. 1 with the hopper omitted.

Fig. 4 shows a front elevation.

Fig. 5 shows a rear elevation.

Fig. 6 shows a partially diagrammatic transverse elevation of the machine on the line 6—6 of Fig. 3 with parts omitted.

Fig. 7 shows a partial section on the line 7—7 of Fig. 2.

Fig. 8 shows a fragmentary section on the line 8—8 of Fig. 7, with parts omitted.

Fig. 9 shows a section on the line 9—9 of Fig. 7.

Fig. 10 shows a semi-diagrammatic section on the line 10—10 of Fig. 6.

Fig. 11 shows a semi-diagrammatic section on the line 11—11 of Fig. 10.

Fig. 12 shows a section on the line 12—12 of Fig. 6.

Fig. 13 shows a plan of the machine with the turntable removed.

Fig. 14 is a section on the line 14—14 of Fig. 13.

Fig. 15 is a section on the line 15—15 of Fig. 3.

Fig. 16 is a section on the line 16—16 of Fig. 2.

Fig. 17 is a section on the line 17—17 of Fig. 2.

Fig. 18 shows a plan view of the controller.

Fig. 19 is a section on the line 19—19 of Fig. 18.

Figs. 20, 21, 22, 23 and 24 are sections respectively on the lines 20—20, 21—21, 22—22, 23—23 and 24—24 of Fig. 19.

Fig. 25 shows a fragmentary section on an enlarged scale of the right hand end of Fig. 18 on the line 19—19.

Fig. 26 is a section on the line 26—26 of Fig. 25.

Fig. 27 is a section on the lines 27—27 of Figs. 19 and 25; and

Fig. 28 is a diagrammatic section showing the valve controlling the shaker cylinder at the end of its travel opposite to that shown by Fig. 25.

In the operation of drifting in mines, it is customary to break down the material at the heading and afterwards remove such material from the floor of the drift and convey it to the surface. The clearing away of such material is termed "mucking." While this operation is being carried on, it is impractical to continue work at the heading and therefore it is of importance to perform the mucking operation in the shortest possible time. For this purpose my invention is particularly adapted.

Referring particularly to Figs. 1 to 17 inclusive, the submitted embodiment of my invention comprises a truck having a frame 1 carried by suitable wheels 2 on the rails 3. These rails are placed on the floor of the drift and extend towards the heading. On the floor of the drift are placed suitable iron plates or the like, one of which is shown at 4 in Fig. 1, on which the material broken down at the heading falls. The plates afford a convenient surface from which to shovel or scoop the material.

Figure 1:
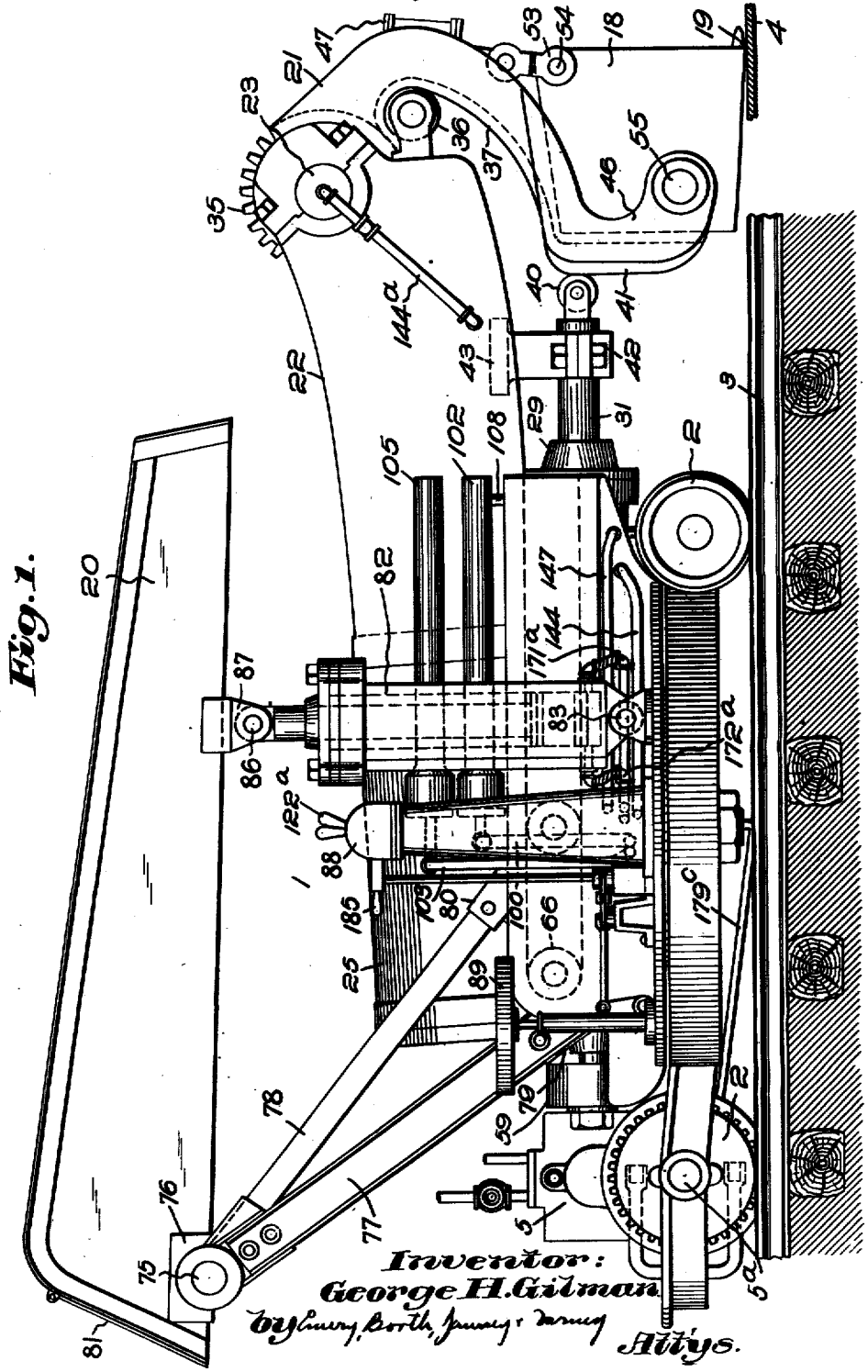
Fig. 1 shows a front elevation of the entire machine.

As shown, for propelling the truck along the track, a suitable motor 5 is provided which is geared to the rear axle $5^a$ of the truck by reversible reduction gearing located in the casing $5^b$. This part of the submitted embodiment of my invention is best shown by Figs. 1, 3 and 13. For controlling the reversing gear are clutches 6 and 7 adapted to be operated by means of a piston 8 reciprocably mounted in the cylinder 9 by compressed air or other motive fluid in a manner hereinafter explained. The piston is normally held in an intermediate position by the springs 10 and 11, and carried by the piston and projecting from the opposite ends of the cylinder are the piston rods 12 and 13 which carry fork members 14 for shifting the clutch members 6 and 7. When the piston is moved to one end of its stroke, the clutches 6 and 7 cooperate with the gearing in such a manner that the motor drives the truck along the track in one direction and when the piston is moved to the opposite end of its stroke, these clutches influence the gearing in such a manner that the piston is driven in the opposite direction along the track. When the piston is in its intermediate position, the gearing is at neutral and the truck is not moved. To insure that the piston is held in its intermediate position, I provide a non-positive lock comprising a spherical detent 15 adapted to be pressed into engagement with the groove 16 on the piston by means of a spring 17. As the details of the gearing are not claimed in this application further description of the same other than necessary to describe its application to my present invention is not given.

Providing means for raising the material from the floor of the drift, I have shown a shovel in the form of a bucket or scoop 18 having a scooping edge 19. Herein this bucket is adapted to be forced into and through the work and raised to fill the bucket with material and to dump it into a hopper 20, positioned above the machine, the bucket being shown in its raised position by dotted lines in Fig. 2. When the hopper is filled, the forward end is raised as shown in dotted lines in Fig. 2 to permit the material to slide out of the hopper and fall into a mine-car behind the truck.

As illustrated the bucket is carried by a swinging bucket arm 21, pivoted to a suitable housing comprising the side members 22, by means of the shaft 23. For moving the arm I have shown rams comprising cylinders 24 and 25 and having respectively mounted therein for reciprocation the pistons 26 and 27. Extending through the front heads 28 and 29 of the cylinders 24 and 25 respectively are piston rods 30 and 31. By admitting and exhausting motive fluid in the manner herein afterwards explained to and from the opposite end portions of the cylinders, the pistons and their rods are caused to reciprocate. Herein the upper piston rod 30 has connected thereto a rack 32 provided with teeth 33 meshing with the teeth 34 of the segmental gear portion 35 of the swinging bucket-carrying arm. As shown the forward end of the rack 32 carries the roller 36 which is adapted to ride on the cam track 37 formed on the back or lower portion of the arm. This track is so formed that the motion imparted thereto by the thrust of the rack is a uniform circular movement corresponding to that imparted by the rack to the gear 35. The parts are so designed that while the roller is in engagement with the track it takes most of the load off the gear teeth and is in such engagement while the bucket is being forced through the material. When the arm is moved from its initial position through approximately half of its swing, it is moved out of engagement with the roller 36 and for the remainder of its swing, the ram moves it by means of the gear teeth. When the arm has moved the bucket to the limit of its travel and dumped it, the arm is moved back by the gear teeth to such position as will bring the roller into engagement with the cam track and further rearward movement of the rack permits either the roller to lower the arm or the gear teeth to force it into its lower position. In this connection it will be noted that the roller acts on the ram with a greater leverage than is afforded by the toothed portions of the rack and gear.

As is shown by Figs. 2, 3, 15 and 17, the frame is provided with a guide having a lower portion 38 cooperating with the bottom of the rack, and side members 39 cooperating with the sides of the rack. This guide in an obvious manner holds the rack to a predetermined path of movement and takes up the reaction thereon imparted thereto by the swinging-bucket arm.

For securing an additional thrust to the bucket when it is first forced into the work, the piston rod 31 hereinbefore referred to is illustrated as having mounted on the end thereof a freely rotatable roller 40, which cooperates with the track 41 formed on the lower portion of the back or lower side of the swinging arm. This roller imparts to the swinging arm in its movement a powerful thrust in addition to that imparted by the roller 36 for the reason that it operates on the arm with a much greater leverage. For guiding the piston rod 31, a guide member 42 is shown having an opening which receives the forward portion of the piston rod 31. This guide member is carried by a portion 43 shown integrally connected with the oppositely disposed side members 22 of the frame.

As shown by Figs. 3 and 17, the swinging bucket-carrying arm is channel shaped in cross-section. The side members 44 of the channel extend downwardly in the position of the ram shown by Figs. 1 and 2 to a position adjacent the bucket where they flare outwardly to form the transverse projections 45 conforming to the outline of the bucket, the portions 45 comprising the webs 46 extending to adjacent the lower portion of said bucket. As shown, to provide a motion of the scooping edge 19 of the bucket transversely to its swinging or shoveling movement, a ram comprising a cylinder 47 is carried by the swinging arm. This cylinder is provided with bosses 48 secured to the side members 44 of the swinging arm by means of bolts 49 as shown by Figs. 16 and 17. In the cylinder is mounted a piston 50 provided with a rod 51 extending through the lower end of the cylinder. To the rod is pivotally connected a bifurcated link 52 having the arms 53 pivotally secured at 54 to the upper forward corner of the bucket as is clearly shown in Figs. 1 and 2. To permit the bucket to be swung relatively to the arm 21, it is pivoted to the opposite webs 46 by means of the trunnions 55. The parts are so proportioned that the piston 50 under normal conditions will be held at an intermediate portion of its stroke and air pressure is normally maintained on the upper surface of the piston so that the piston is normally forced to its outer position. This provides a resilient extensible connection between the bucket and the swinging arm which permits the scooping edge of the bucket to follow irregularities in the floor of the drift or of the plates 4. By alternately admitting and exhausting motive fluid to and from the opposite ends the cylinder 47, the scooping edge of the bucket may be shaken or vibrated which will aid the bucket to pick up large fragments of the material being mucked.

The side members 22 of the frame hereinbefore referred to are shown in the submitted embodiment of my invention as formed integrally with the cylinders 24 and 25, the side members adjacent the head 28 of the cylinder 25 being flared as shown by Figs. 3 and 5 to admit removal of said head. As has hereinbefore been pointed out, the forward portion of the side members 22 are held in spaced relation by the rack guide 38 and by the support 43 for the guide 42. This member which includes the cylinders 24, 25 and the frame also includes a cylinder 56 provided with a piston 57, the latter of which has attached thereto a rod 58 secured to an upstanding portion 59 of the table 60, which preferably is pivotally carried by the truck and is hereinafterwards referred to as the turntable. As is shown by Fig. 7, the rod and piston are provided with passages 61 and 62 respectively opening into the cylinder at opposite sides of the piston. In a manner hereinafter to be explained the rear end 63 of the cylinder is constantly supplied with motive fluid admitted through the passage 61 and this tends to hold the casting carrying the pistons 26, 27 and the swinging-bucket arm 21 in their rearmost position. By admitting air to the forward end of the cylinder 56, the air acting on the larger forward end of the piston overcomes the pressure of the air constantly acting on the rearward face of the piston and moves the entire casting and hence the bucket up to the work and under ordinary conditions will aid the pistons 26 and 27 to force the bucket into and through the work in the initial portion of its movement.

As is shown by Figs. 3, 6 and 7, the turntable 60 is provided with upstanding members 64 having formed therein guideways 65 forming a track for rollers 66 carried by the frame and cylinder casting. This permits the casting to be easily carried up to and away from the work.

Figure 2:
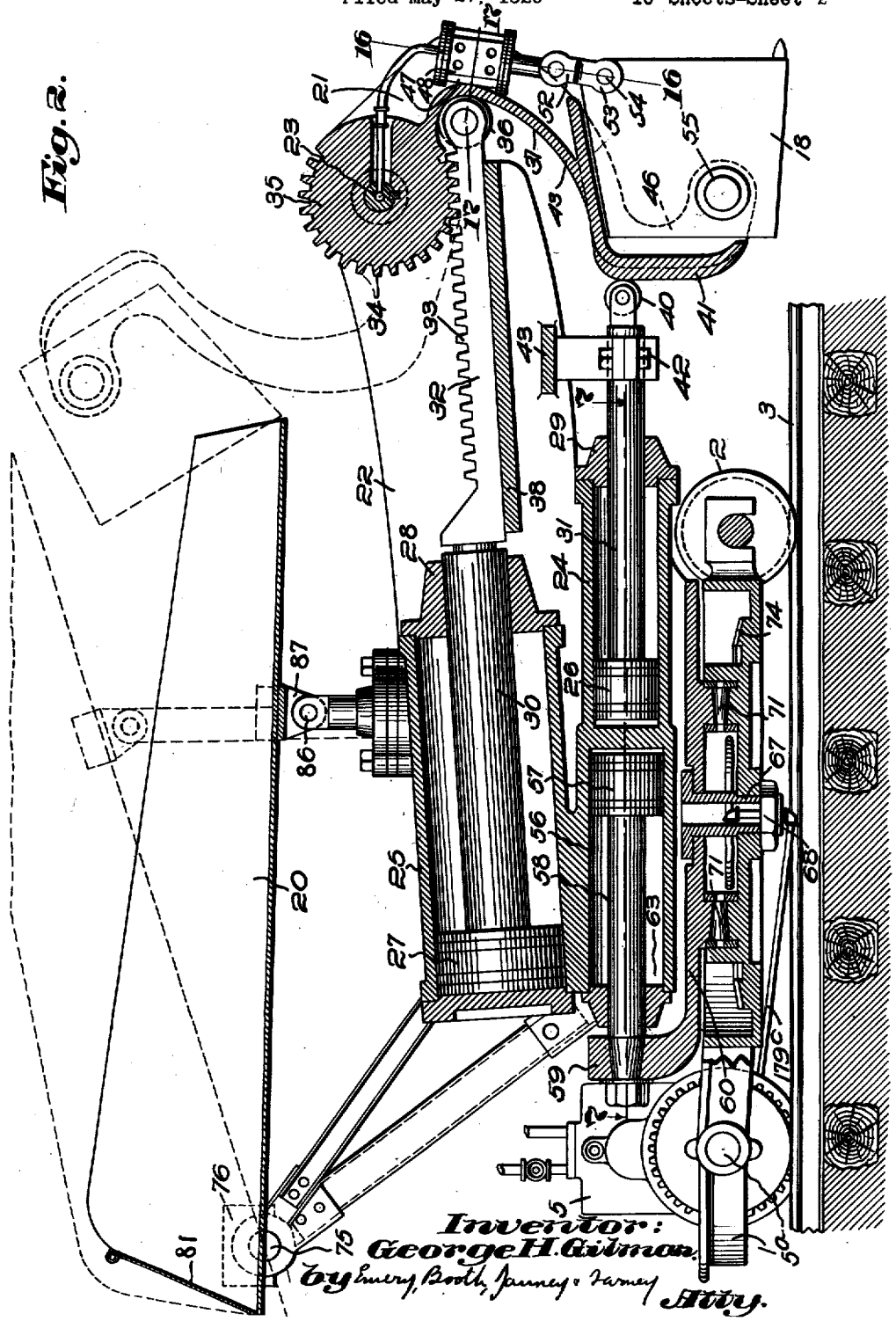
Fig. 2 shows a longitudinal vertical section on the line 2—2 of Fig. 3.

As shown by Figs. 2 and 6, the turntable 60 is pivoted to the truck frame by means of a pivot 67 secured by means of a nut 68 which draws the shoulder 69 of the pin against the upper portion of the frame. The upper end of the pin is formed with a collar 70 engaging the turntable. The weight of the turntable is carried by the antifriction rollers 71 engaging suitable tracks formed on the adjacent surfaces of the truck frame and turntable.

For rotating the turntable on the truck I have shown a motor 72 mounted on the turntable and suitably geared as shown by Figs. 7, 8, 9 and 13 to a bevelled gear 73 meshing with a rack 74 formed on the upper surface of the truck frame. By changing the direction of rotation of the motor the turntable may be rotated in either direction.

The hopper 20 hereinbefore referred to is shown as pivoted at its rear end, by means of trunnions 75, to a casting 76 to which are bolted or otherwise secured the channel-iron struts 77 and 78, a pair of these struts being provided for each side of the machine. The lower ends of the struts are supported by the turntable and as shown are secured to suitable lugs 79 formed on the rear end of the upstanding guide members 64 while the lower portion of the struts 78 are secured to lugs 80 projecting from the upper portion of said guide members. The back of the hopper is provided with a suitable swinging door 81 which preferably automatically unlocks and opens when the hopper is tilted and automatically closes and locks when the hopper is in its normal position as will be clearly understood by those skilled in the art.

As illustrated, for tilting the hopper, a pair of rams comprising the cylinders 82 are positioned on opposite sides of the turntable, the lower portion of the cylinders being pivoted to the turntable by means of pins 83. These cylinders are provided with pistons 84 having rods 85 which are pivoted by means of pins 86 carried by the piston rod and engaging suitable lugs 87 carried by the hopper. Normally, air is admitted to the upper side of the pistons 84 in order that the hopper will be securely held in its lowered position. By admitting air beneath the piston and exhausting the air above the piston in the manner which is hereinafter described, the piston is forced upwardly, and the hopper is tilted. When the air below the hopper is cut off and exhausted, the hopper descends.

Mounted on the turntable is shown an operator's seat 89, and in convenient relation thereto is positioned a controller for governing the admission and exhaust of motive fluid for the various instrumentalities of the machine. Herein this controller comprises a hollow vertical standard 90 and an upper transverse portion 88, the latter containing a series of valves with operating handles projecting therefrom in position to be manipulated by the operator. Through the hollow standard extends the pipes conducting the air to and from the various instrumentalities of the machine. The submitted form of controller valves which are best illustrated by Figs. 18 to 28 will now be described.

Through the controller extends a longitudinally arranged cylindrical arbor 91 provided with an upper conduit 92 to which is connected the live motive fluid supply and a lower longitudinally extending conduit 93 which discharges the used motive fluid to any convenient place of disposal. Mounted on the arbor 91 are a series of oscillatory valves 94, 95, 96, 97 and 98. These valves are held in spaced relation by means of spacers 99 in the form of short stationary sleeves surrounding the arbor and abutting the end surfaces of adjacent valves, as is clearly illustrated by Figs. 19 and 27. These valves will now be described.

The valvular member 98 is a compound valve for controlling motive fluid to the cylinders 24 and 25 for swinging the bucket and the cylinder 47 for shaking the bucket. As has hereinbefore been pointed out, the corresponding front ends and rear ends of the cylinders 24 and 25 are connected in parallel so that the motive fluid will move the pistons 26 and 27 simultaneously in the same direction. For conducting motive fluid to and from the front ends of the cylinders, a suitable pipe 100 is tapped into the arbor 91 and communicates with the passage 101 formed in the arbor to and from which motive fluid is adapted to be intermittently admitted and exhausted by the valvular member 98. The pipe 100 leads down through the hollow standard 90 of the controller to the bottom thereof and extends upwardly as shown by Fig. 1, and then enters the lower cylinder 102 of a pair of telescopic members located at the side of the cylinders 24 and 25. For conducting motive fluid to and from the rear ends of the cylinders, a second pipe 103 in a similar manner communicates with the passage 104 in the arbor to and from which motive fluid is alternately admitted and exhausted to admit and exhaust motive fluid from the pipe 103. The pipe 103 extends downwardly through the hollow standard 90 of the controller and through the lower portion thereof after which it extends upwardly and enters the upper cylinder 105 of the pair of telescopic cylinders just referred to. The cylinders 102 and 105 of the telescopic members are constrained to move with the cylinders 24 and 25 by means of the pipe connections therewith described below, and if desired, the bracket 106 shown in Figs. 3, 10 and 11 may be employed to provide additional means for securing these members to the cylinders 24 and 25. The pipes 100 and 103 are stationary relative to the cylinders 102 and 105 and for providing a fluid tight joint therebetween, a stuffing box 107 shown in Fig. 10 may be located at the end of the cylinders and through which the pipes extend. From the cylinder 102 to the forward end of the cylinder 24 leads a pipe 108 and from the same cylinder 102 leads a second pipe 109 to the forward end of the cylinder 25. From the cylinder 105 lead the pipes 110 and 111 respectively leading to the rear ends of the cylinders 24 and 25. In this connection it will be understood that the pipes just referred to and those hereinafter mentioned may be run on the machine in any convenient manner and that they are shown in the drawings for purposes of convenient illustration, slightly displaced from what is perhaps their most satisfactory position.

As illustrated by Figs. 7 and 10, leading from the point of communication with the cylinders 24 and 25 of the pipes 108, 109, 110 and 111 to the appropriate ends of the cylinders are suitably cored passages 112, 113, 114 and 115. These cored passages serve to conduct the motive fluid to and from the cylinders. As illustrated, these passages communicate at the extreme end of the cylinder through a restricted passage 116 and at a point removed from the ends of the cylinders with a larger passage 117. By this means when an end of the cylinder is exhausted and the piston moves towards that end, it overruns the passage 117 and traps the motive fluid in front of the piston, which motive fluid may only escape through the restricted passage 116. This provides a cushion for the piston at the end of the stroke. If motive fluid is admitted to the cylinder when the piston is at the end of its stroke, the motive fluid will pass through the passage 116 to the end of the cylinder and start the cylinder slowly and after it has moved sufficiently far to uncover the passage 117, an unrestricted supply of air to the cylinder is afforded. This prevents jarring of the parts by starting the piston too suddenly.

For controlling the supply and exhaust of motive fluid to and from the passages 101 and 104, the valvular member 98 is formed on the interior surface thereof adjacent the arbor with grooves 118 and 119, which grooves are adapted to alternately establish communication between the passages 101 and 104 and the ports 120 and 121 respectively leading to the air supply passage 92 and the exhaust passage 93. In the position of the valve shown by Fig. 26, the port 120 is in communication with the passage 101 and the port 121 is in communication with the passage 104. Therefore, in this position of the valve, motive fluid is admitted to the pipe 100 whence it flows to the front end of the cylinders 24 and 25 and the pipe 103 is connected with the atmosphere which exhausts the rear ends of the cylinders 24 and 25. This holds the pistons 26 and 27 in their rearmost position. If it is desired to move the pistons towards the forward end of the stroke, the operator by means of the handle 122ª moves the valve counter-clockwise as viewed in Fig. 26 and by means of the grooves 118 and 119 connects port 120 with the passage 104 and the port 121 with the passage 101. This reverses the flow of motive fluid and connects the pipe 103 to the inlet and the pipe 104 to the atmosphere. The grooves 118 and 119 are so formed that the ends thereof have the same relative position to the ports communicating with the passages 101 and 104 so that these ports are each for any position of the valve open the same amount. In this way a small inlet opening for live motive fluid corresponds with a small discharge opening for exhaust motive fluid. It will be obvious that with a small inlet opening and a small exhaust opening, the pistons will move slowly, and that if these openings are increased, the pistons will move more rapidly. From this it follows that by suitably adjusting the valve the operator is enabled to control the speed and force of movement of the pistons.

For controlling the admission and exhaust of air to the cylinder 47 for shaking the bucket by moving its scooping edge transversely to the direction of the swing, is provided a valve 122 mounted in an enlargement 123 of the compound valvular member 98. This valve is provided with a stem 124 fixed to the valve and extending through and projecting from the end of the handle 122ª provided for the purpose of oscillating the member 98. Exteriorly of the handle the stem 124 is provided with a button 125 adapted to be engaged by the thumb or other portion of the hand of the operator which grasps the handle 122ª. The chamber 126 receiving the valve is provided with three annular grooves 127, 128 and 129. The central groove 128 is connected with the air passage 92 of the arbor in all positions of the valvular member 98 by means of a port 130 formed in the arbor and an annular groove 131 and passage 132 formed in the valvular member 98. The valve is normally biased to its upper position by means of a spring 133 and the valve is provided with a central reduced portion 134 adapted in the raised position of the valve to connect the groove 128 with the passage 135, the latter leading by conduits hereinafter described to the top of the cylinder 47. The valve 122 and stem 124 are provided with an internal passage 136 which opens through a port 137 into the interior chamber 138 of the handle 122ª which chamber communicates with the atmosphere through a passage 139. In the raised position of the valve, the internal passage 136 is in communication with the lower groove 127, to which is connected the passage 140 leading by conduits hereinafter set forth to the bottom of the cylinder 47. Thus when the valve 122 is in its raised position, not only is the top of the cylinder 47 supplied with motive fluid but the bottom of the cylinder is connected to the atmosphere. This, under normal conditions causes the piston 50 contained in the cylinder 47 to constantly force the bucket to the outermost portion of its swing relative to the bucket-carrying arm. When the valve is depressed by means of a button 125 to its lower position as illustrated by Fig. 28, the live air groove 128 of the valve is connected by way of the groove 129 and the reduced portion of the valve 134 to the passage 140 leading to the bottom of the cylinder, and at the same time the passage 135 connected to the top of the cylinder 47 is vented to the atmosphere through the groove 127 and chamber 141 surrounding the valve stem and the passages 142 leading to the atmosphere.

The only force to be overcome when the button 125 controlling the valve is depressed is that exerted by the spring 133, the pressure of the motive fluid being balanced. Further it will be obvious that by reciprocating the valve, the piston 50 may be caused to reciprocate and as the valve 122 is formed without admission or exhaust lap, that the movement of the piston may be controlled with nicety.

The valvular member 98 controlling the air to the cylinders 24 and 25 is normally biased to the position shown in Fig. 26 by means of a spring 143 and the valve 122, as heretofore explained under normal conditions is biased by means of the spring 133 to its upper position. Therefore, when the operator removes his hand from the handle 122ª, motive fluid is admitted to the front ends of the cylinders 25 and 26 and to the upper end of the cylinder 47, and exhausted from the opposite ends of these cylinders. From this it results that in the normal position of the handle 122, the swinging bucket arm 21 is in its lower position and the bucket is under the tendency to move to its outermost position.

For admitting and exhausting air to and from the upper end of the cylinder 47 is provided a pipe 144 which is tapped into the arbor and communicates with the passage 145 in communication with an annular groove 146 with which the passage 135 leading to the valve 122 communicates. For conducting motive fluid to and from the lower end of the cylinder is provided a similar pipe 147 communicating with the passage 148 formed in the arbor, which passage leads to an annular groove 149 in communication with the passage 140 leading to the valve 122. As will be readily understood, the pipes 144 and 147 are always in communication with the passages 135 and 140 irrespective of the position of the valve 98.

The pipes 144 and 147 lead downwardly through the hollow standard 90 and across the floor of the turntable leading around and under the front end of the cylinder 24 to the opposite side of the machine where they turn upwardly and connect with the cylinders 150 and 151, the pipe 144 terminating inside the lower cylinder 151 and the pipe 147 inside the upper cylinder 150. The cylinders 150 and 151 are similar to the cylinders 102 and 105 on the opposite side of the machine hereinbefore described and are supported by the pipe connections and the bracket 106 carried by the cylinder 25 in a similar manner. The shaft 23 supporting the swinging bucket-carrying arm is provided as illustrated by Fig. 15 with opposite bores designed to form passages 152 and 153, and extending into these passages respectively are pipes 147ª and 144ª respectively leading from the cylinders 151 and 150. These pipes are rotatively mounted in the passages 152 and 153 and are kept in tight relation therewith by means of the stuffing boxes 154. The pipe 144ª connects with the lower cylinder 151 as is illustrated in Figs. 10 and 11 while the pipe 147ª connects with the upper cylinder 150. The passages 152 and 153 in the manner illustrated by Figs. 2, 3, 4 and 16 are connected by short pipe sections 147ᵇ and 144ᵇ respectively to the lower and upper ends of the cylinder 47. It will thus be seen that the passage 135 of the controller valve by means of the pipe 144, the cylinder 151, the pipe 144ª, the passage 153 in the spindle and the pipe 144ᵇ is in constant communication with the upper end of the cylinder 47, while the passage 144 of the valve 98 by means of the pipe 147, cylinder 150, pipe 147ª, the passages 152 in the spindle and the pipe 147ᵇ is in constant communication with the lower end of the cylinder.

As hereinbefore pointed out, the space 63 at the rear end of the cylinder 56 is in constant communication with the motive fluid supply in order that the carriage including this cylinder and the cylinders 24 and 25 will be normally maintained in its rearward position. This space 63 provides a reservoir for the motive fluid supply for all the instrumentalities of the machine and the carriage is fed forward by admission of air to the front end of the cylinder 56 through the pipe 62. For controlling the air admitted and exhausted through the passage 62 I provide the valve 97, which as is shown by Fig. 19 is located immediately adjacent the valve 98 hereinbefore referred to. Extending through the arbor 91 to the surface thereof surrounded by the valve 97 are radially arranged ports 154 and 155 establishing communication between the motive fluid supply conduit 92 and the exhaust conduit 93 and the exterior surface of the arbor. Formed in the arbor intermediate the passages 154 and 155 are the U-shaped passages 156 and 157 illustrated by Fig. 27, the passages communicating with the exterior of the arbor at one end in the same plane as the ports 154 and 155 and with the exterior of the arbor to the left of the seat of the valve 97. The passages 156 and 157 respectively communicating with pipes 158 and 159, the latter respectively leading to the passages 61 and 62 of the piston within the cylinder 56. On the exterior surface of the arbor is formed a groove 160 which places the port 154 and the passage 156 in constant communication with each other. Thus the rear end of the cylinder 56 is always in communication with the motive fluid supply, regardless of the position of the valve 97. Formed in the interior wall of the valve 97 are the arcual grooves 161 and 162. The valve is normally held in the position illustrated by Fig. 24, by the spring 163 and thereby the pipe 159 leading to the passage 62 normally places the front end of the cylinder in communication with the exhaust. If the valve is turned counter-clockwise, as viewed by Fig. 24, by means of the handle 164, the groove 62 is moved out of communication with the exhaust and the passage 157 placed in communication with the live air conduit 92 by means of the groove 161. This connects both ends of the cylinder 56 to the motive fluid supply and therefore feeds the carriage forwardly. The speed with which the carriage moves may be controlled by the degree of opening of the passage 155 to the groove 162 and the opening of the passage 157 to the groove 161. The pipes 158 and 159 connecting the valve 97 with the passages 61 and 62 extend downwardly through the controller standard 90 to the rear end of the machine as illustrated by Fig. 7.

To the left of the valve 97 just referred to is the valve 96 for controlling the air supply to the cylinders 82 for elevating or tilting the hopper 20. This valve as shown in Fig. 23 is provided on its interior surface with grooves 165 and 166. Placing of the exterior surface of the arbor within the confines of the valve in communication with the inlet passage 92 and the exhaust passage 93 of the arbor are ports 167 and 168 and in the same plane therewith are ports of U-shaped passages 169 and 170 similar to those described in connection with the valve 97. To the passages 169 and 170 respectively are connected pipes 171 and 172 which latter are respectively adapted to convey air to and from the lower and upper portions of the cylinders 82. The valve is normally held in the position illustrated by Fig. 23 by the spring 173 in which position, the pipe 171 leading to the bottoms of the cylinders 82 is placed in communication with the atmosphere by means of the passage 169, groove 166, port 168 and passage 93 of the arbor, while the pipe 172 leading to the tops of the cylinders is in communication with the motive fluid supply through the passage 92 of the arbor, port 167, groove 165 and the U-shaped passage 170. The pipes 171 and 172 just referred to lead downwardly through the standard 90 in the controller to a point adjacent the floor of the turntable where the pipe 171 through a T-connection branches into the pipes 171$^a$ and 171$^b$ and the pipe 172 through a similar T-connection branches into the pipes 172$^a$ and 172$^b$. The pipes 171$^a$ and 171$^b$ lead to the lower ends of the cylinders 82 and the pipes 172$^a$ and 172$^b$ to the upper end thereof. In this way the upper and lower portions of the respective cylinders 82 are connected in parallel so that their respective pistons may move simultaneously in the same direction. To allow for the slight oscillatory movement of the cylinders 82, the pipes 171$^b$ and 172$^b$ are attached to the cylinders by sections of a flexible conduit 171$^c$ and 172$^c$ as illustrated by Fig. 12. In the wall of the cylinders 82 are formed passages 173$^a$ and 174 similar to those described in connection with the cylinders 24 and 25. These passages serve to conduct air to and from the opposite ends of the cylinder.

As has hereinbefore pointed out, air is alternately admitted and exhausted to and from the opposite ends of the cylinder 9 for operating the clutches 6 and 7 controlling the speed reduction gearing for operating mechanism for driving the traction wheels of the truck. For so controlling the air to the cylinder 9 is provided a valve 95 mounted on the arbor 91 to the left of the valve 96 just described. As is clearly shown by Fig. 22, the arbor is provided with ports 175 and 176 placing the exterior surface of the arbor in communication with the live air conduit 92 and the exhaust conduit 93. Opening on the exterior surface of the arbor in the same plane with the ports 175 and 176 are the ends of the U-shaped passages 177 and 178 to the opposite end of which passages are respectively connected the pipes 179 and 180 leading to the ends of the cylinder 9. On the interior surface of the valve adjacent the arbor are formed arcular passages 181 and 182 which in the normal position of the valve illustrated by Fig. 22, connect both pipes by means of the passages 177 and 178 to the atmosphere by way of the port 176 and passage 93 of the arbor. The valve 95 is held normally in its central position by means of springs 184. When the valve by means of the handle 183 is turned from either side of its neutral position, one of the passages 177 and 178, is taken out of communication with the groove 182, while the other is maintained in communication therewith and at the same time the passage which has been taken out of communication with the passage 182 is placed in communication with the motive fluid supply by means of the groove 181. Therefore, when the valve is moved from either side of its central position, one end of the cylinder 9 is connected to the atmosphere and the other to the motive fluid supply and consequently the piston 8 is moved in a direction dependent upon the direction of movement of the valve handle.

The pipes 179 and 180 as shown by Fig. 7, extend down through the hollow standard 90 of the controller and communicate with the passages formed in the turntable, one of which is indicated at 179$^a$ in Fig. 6. As is illustrated by Figs. 6 and 13, to these passages are connected flexible conduits 179$^b$ and 180$^b$ respectively connected to pipes 179$^c$ and 180$^c$ leading through the turntable spindle 67 and beneath the truck to the opposite ends of the cylinder 9 and communicating therewith through ports 179$^d$ and 180$^d$.

If desired, a suitable valve for controlling a brake not shown for the wheels of the truck may be provided. Such a valve is shown at 94 in Figs. 19 and 20. As the details of the brake form no part of my invention claimed in this application, this valve is not described.

As has hereinbefore been pointed out, a motor 72 is provided for rotating the turntable on the truck. For controlling the motor a suitable handle 185 shown by Figs. 7 and 18 is carried by the controller. This handle by means of suitable rock shafts, links and levers unnecessary to describe in detail, is connected to manipulate the lever 187 for operating the reversing valve of the motor. When the lever 187 is in the position illustrated by Fig. 8, the motor is stationary. When moved to the right or left of this position, the motor runs forward or backward as the case may be.

Having described the function and operation of various parts of the machine illustrating one form of my invention, I will now describe one way in which the entire machine may be operated. Assuming the drift is to be mucked an air hose for conveying motive fluid to the machine is suitably connected to the conduit 92 and the air admitted. The position of the parts now are as shown by Fig. 2. The operator then presses down the valve 122 by means of the button 125 which exhausts the upper portion of the cylinder 47 and admits air to the lower portion. This raises the bucket about its fulcrum 55 relatively to the arm 21. Keeping the button still depressed and therefore the bucket in its raised position, the operator now pushes the handle 183 of the valve 95 forward which throws in the gear of the traction mechanism and moves the truck along the track up to the material to be mucked. When the machine approaches as near to the work as desired the operator removes his hand from the handle 183 which permits the valve 95 controlling the traction mechanism to move to its neutral position and thus causes the truck to come to rest on the track. By means of the valve 94, the brakes (not shown) are now set by the operator to hold the machine stationary. By removing his hand from the button 125, the valve 122 is now caused to rise under the influence of the spring 133 and this admits motive fluid to the upper end of the cylinder 47 and exhausts it from the lower end forcing the bucket downwardly until its scooping edge 19 comes in contact with the plates 4 resting on the floor of the drift, the piston 50 of the cylinder 47 coming to rest in an intermediate position is shown by Fig. 16. The operator now pushes the handle 164 of the valve 97 forwardly which admits air into the forward end of the cylinder 56 and pushes the carriage comprising the cylinders 24 and 25 and the frame carrying the bucket swinging arm forwardly, which pushes the bucket up to and into the work. Holding the handle 164 in this position, the operator now pushes forwardly the handle 122ª which admits air to the rear end of the cylinders 24 and 25 and exhausts the same from the forward portion of these cylinders. This causes the bucket to be forced into the work and through it so as to fill it with material and to raise it, the scooping edge of the bucket during this step following the conformation of the surface of the plates until the piston 50 reaches the end of its outer stroke. If, while thus forcing the bucket into and through the work, it should become necessary, as would be the case, for example if a large fragment should be encountered by the scooping edge of the bucket, the operator by moving the button 125 may vibrate the bucket so that its scooping edge moves transversely to the direction in which it swings. When the bucket in its upward swing rises above the material being shoveled, the operator permits the valve 97 to return to its normal position causing the carriage to move back to the position shown by Fig. 2, so that the bucket at the end of its upward swing will be in position to discharge its contents into the hopper. After the bucket is discharged, the valve 98 is permitted to assume its normal position and this causes the bucket-carrying arm to descend. By again pressing the button 125, the bucket is raised slightly off the floor of the drift and the operator by turning the handle 185 in the proper direction then causes the turntable to move so as to bring the hopper in line with a mine-car which at this time has been moved to a position directly behind the truck. By pulling up the handle 186 the valve 96, may be then moved to exhaust the upper end of the cylinders 82 and admit air below the same, which tilts the hopper and discharges its contents into the mine-car. If at any time it should be desired to cause the material at the front end of the hopper to move to the back end this may be done by suitably admitting and exhausting air to and from the cylinders 82, thus jolting the hopper to cause this to happen. The machine is now in position to repeat the foregoing operation.

It is to be understood that the foregoing description is that of only one embodiment of my invention, which particular embodiment has been described in detail to illustrate one specific way of how the invention may be practiced. Accordingly wide deviations from this embodiment may be made without departing from the spirit of my invention.

I claim:

1. In a device of the character described, a bucket, means for moving the bucket up to the material to be handled, means for forcing the bucket into such material, means for raising and discharging the bucket, and means constantly tending to withdraw the bucket from said material.

2. In a device of the character described, a bucket, means for forcing the bucket into the material to the handled, means for raising and discharging the bucket, means constantly tending to withdraw the bucket from said material, and means for overcoming said latter means for feeding the bucket toward said material.

3. In a device of the character described, a bucket, means for moving the bucket up to the material to be handled, means for forcing the bucket into such material, means for raising and discharging the bucket, and fluid pressure means constantly tending to withdraw the bucket from said material.

4. In a device of the character described, a bucket, means for forcing the bucket into such material, means for raising and discharging the bucket, fluid pressure means constantly tending to withdraw the bucket from said material, and means for overcoming said latter means for feeding the bucket toward said material.

5. In a device of the character described, a bucket, means for forcing the bucket into such material, means for raising and discharging the bucket, fluid pressure means constantly tending to withdraw the bucket from said material, and fluid pressure means for overcoming said latter means for feeding the bucket toward said material.

6. In a device of the character described, a bucket, means for moving the bucket, said means comprising a member having a large and a small area, means for constantly supplying pressure fluid to one of said areas, means for supplying fluid to the other of said areas to move the bucket in one direction, and means for exhausting said pressure to move the bucket in another direction.

7. In a device of the character described, a bucket, a plurality of fluid pressure devices for moving said bucket, means for admitting fluid to said devices to cause movement thereof, and one of said devices providing a fluid pressure reservoir.

8. In a device of the character described, a bucket, a plurality of fluid pressure devices for moving said bucket comprising a ram having a pressure chamber, a source of pressure fluid supply, and means for constantly conducting pressure fluid to said chamber and intermittently to other of said devices.

9. In a device of the character described, a bucket, means for operating said bucket, means for moving said bucket comprising a ram having opposite large and small areas, means for constantly supplying fluid pressure to the smaller area, and means for putting said areas in communication to cause movement of the bucket.

10. In a device of the character described, a bucket, means for operating said bucket, means for moving said bucket comprising a ram having opposite large and small areas, means for constantly supplying fluid pressure to the smaller area, means for putting said areas in communication to cause movement of the bucket, a fluid pressure device other than said ram for moving said bucket, means for intermittently supplying fluid to said fluid pressure device, and a common source of supply for said ram and fluid pressure device.

11. In a device of the character described, a bucket, fluid pressure motor devices for operating said bucket, a source of fluid pressure supply, one of said fluid pressure motor devices constituting a reservoir of fluid pressure, means connecting said source of supply to said device constituting said reservoir, and means for utilizing the fluid stored in said reservoir for operating said devices.

12. In a device of the character described, a bucket, fluid pressure rams for moving said bucket longitudinally without swinging for filling said bucket and then swinging said bucket for raising it, and a unitary member providing cylinders for said rams.

13. In a device of the character described, a bucket, a fluid pressure ram for moving said bucket longitudinally, a fluid pressure ram for swinging said bucket, a movable unitary member providing cylinders for said rams, a support for said member, and guide means for said member carried by said support.

14. In a device of the character described, a bucket, means mounted for reciprocatory movement and providing a pair of cylinders, bucket operating mechanism bodily movable with said means, one of said cylinders of said pair having a piston connected to a support which is stationary relatively to said cylinder, and the other cylinder of said pair having a piston for actuating said bucket operating mechanism.

15. In a device of the character described, a bucket, a table, a ram for moving said bucket, said ram carried by said table and comprising a cylinder member and a piston member, means for moving said ram bodily relative to said table, said means comprising a second ram having a cylinder member and piston member, means connecting one of said members of the second ram to one of said members of the first ram and the other of said members of the second ram to the table.

16. In a device of the character described, a bucket, a table, a ram for moving said bucket carried by said table and comprising a cylinder member and a piston member, means for moving said ram bodily relatively to said table, said means comprising a second ram having a cylinder member and piston member, means connecting the cylinders of said ram, means connecting the piston of the first ram to the bucket, and means connecting the piston of the second ram to the table.

17. In a device of the character described, a bucket, a table, a plurality of rams for moving said bucket and comprising cylinder members and piston members, a ram for moving the first rams relatively to said table and comprising a cylinder member and piston member, means connecting one of said members of each of said plurality of rams to the bucket, means connecting one of said members of the second mentioned ram to the table, and means connecting the other of said members of all of said rams each to the other.

18. In a device of the character described; a bucket, a table; a plurality of rams for moving said bucket and comprising cylinder members and piston members; a ram for moving the first rams relatively to said table and comprising a cylinder member and piston member; and means connecting the cylinders of several of said plurality of rams each to the other and their pistons to the bucket, and connecting one of the members of the second mentioned ram to the table and the other member to said cylinders.

19. In a device of the character described; a bucket, a table; a plurality of rams for moving said bucket and comprising cylinder members and piston members; a ram for moving the first rams relatively to said table and comprising a cylinder member and piston member; and means connecting the cylinders of several of said plurality of rams each to the other and their pistons to the bucket, and connecting one of the members of the second mentioned ram to the table and the other member to one of said cylinders.

20. In a device of the character described, a bucket, a table, a plurality of rams for moving said bucket and comprising cylinder members and piston members, a ram for moving the first rams relatively to said table and comprising a cylinder member and piston member, means connecting the cylinders of all of said rams each to the others, and means for connecting the respective pistons of said plurality of rams to the bucket and the piston of the last mentioned ram to the table.

21. A device of the character described having, in combination, a truck, a carriage mounted upon said truck for reciprocating movement, a bucket, an arm carrying said bucket for relative movement, fluid actuated means for moving said bucket relative to said arm independently of motion of said arm, said arm mounted upon said carriage for swinging movement in vertical planes whereby to raise and dump said bucket, and means for reciprocating said carriage relative to said truck for crowding said bucket into the work.

22. A device of the character described having, in combination, a truck, a carriage mounted upon said truck for reciprocating movement, a bucket, an arm carrying said bucket for relative movement, fluid actuated means for moving said bucket relative to said arm independently of motion of said arm, said means comprising a relatively movable cylinder and piston, one of which is connected to said bucket and the other to said arm, said arm mounted upon said carriage for swinging movement in vertical planes whereby to raise and dump said bucket, and means for reciprocating said carriage relative to said truck for crowding said bucket into the work and for swinging said arm relative to said carriage.

23. In a device of the character described, a truck, a carriage mounted on said truck for reciprocating movement, a swinging bucket arm mounted on said carriage, a bucket mounted on said arm for rocking movement relatively thereto, fluid pressure means for moving said bucket comprising a cylinder member and a piston member for rocking said bucket relatively to said arm, means connecting one of said members to said arm, means connecting the other of said members to said bucket, and fluid pressure actuated means for swinging said arm relatively to said carriage and for reciprocating said carriage relatively to said truck for crowding said bucket into the work.

24. In a device of the character described, a truck, a carriage mounted on said truck for reciprocation, a bucket having a scooping edge, an arm mounted on said carriage for swinging said bucket, means on said carriage for actuating said arm, means for reciprocating said carriage relatively to said truck for crowding said scooping edge into the work, means connecting said bucket to said arm and permitting movement of said scooping edge transversely to the path of said swinging, and means for imparting such motion to said scooping edge independently of the swinging of said bucket.

25. In a device of the character described, a truck, a carriage mounted on said truck for reciprocation, a bucket mounted on said carriage and having a scooping edge, means including said carriage for bodily moving said bucket for causing it to be filled and raised, and means acting independently of the first named means for moving said scooping edge relatively to said bodily movement and transversely to the direction thereof.

26. In a device of the character described, a bucket having a scooping edge, mechanism including a bodily reciprocating arm for crowding the bucket into the work, mechanism for swinging said arm for elevating said bucket, and other mechanism for imparting a vibratory motion to said scooping edge.

27. In a device of the character described, a truck, a pivoted arm carried by said truck, a bucket carried by said arm and having a scooping edge, mechanism for reciprocating the pivot of said arm relatively to said truck for crowding said bucket into the work, mechanism for swinging said arm about its pivot for elevating said bucket, and mechanism for imparting a vibratory motion to said scooping edge simultaneously with the swinging of said arm.

28. In a device of the character described, a bucket having a scooping edge, a ram for crowding the bucket into the work, mechanism independent of said ram for elevating said bucket, and mechanism operating independently of the first mentioned mechanism for imparting a vibratory motion to said scooping edge.

29. In a device of the character described, a bucket having a scooping edge, a ram for crowding the bucket into the work, mechanism including a second ram for elevating said bucket, and mechanism operating independently of the first mentioned mechanism for imparting a vibratory motion to said scooping edge simultaneously with the elevating of said bucket.

30. In a device of the character described, a bucket having an edge adapted to scoop loose material from a surface, means for bodily elevating said bucket, and means permitting said edge to follow said surface during part of the movement of elevation.

31. In a device of the character described, a bucket having an edge adapted to scoop loose material from a surface, means for bodily elevating said bucket, and fluid pressure extensible means permitting said edge to follow said surface during part of the movement of elevation.

32. In a device of the character described, a bucket having an edge adapted to scoop loose material from a surface, means for bodily elevating said bucket, and resilient means permitting said edge to follow said surface during part of the movement of elevation.

33. In a device of the character described, a bucket, mechanism for elevating said bucket, means connecting said bucket to said mechanism for limited relative movement thereto, a ram comprising a cylinder member and a piston member, means connecting one of said members to said bucket and the other to said mechanism, and means for normally maintaining said piston member at a predetermined position in said cylinder.

34. In a device of the character described, a bucket, mechanism for elevating said bucket, means connecting said bucket to said mechanism for limited relative movement thereto, a ram comprising a cylinder member and a piston member, means connecting one of said members to said bucket and the other to said mechanism, and means for normally maintaining one end of said cylinder under fluid pressure.

35. In a device of the character described, a bucket, mechanism for elevating said bucket, means connecting said bucket to said mechanism for limited relative movement thereto, a ram comprising a cylinder member and a piston member, means connecting one of said members to said bucket and the other to said mechanism, means for normally maintaining one end of said cylinder under fluid pressure, and means for relieving said pressure and admitting fluid to the other end of said cylinder.

36. In a device of the character described, a bucket, mechanism for elevating said bucket, means connecting said bucket to said mechanism for limited relative movement thereto, a ram comprising a cylinder member and a piston member, means connecting one of said members to said bucket and the other to said mechanism, means for normally maintaining said piston member at a predetermined position in said cylinder, and means for relatively reciprocating said cylinder and piston.

37. In a device of the character described, a bucket, a swinging bucket arm, means pivotally connecting said bucket to said arm, a ram connecting said bucket to said arm, means for normally maintaining said ram under pressure and means for reciprocating said ram.

38. In a shovelling machine, the combination of a bucket, a swinging arm carrying said bucket, a thrust member operating against said arm on the same side of the fulcrum of said arm as said bucket, and a ram for operating said thrust member.

39. In a device of the character described, a bucket, a fulcrumed arm carrying said bucket, a reciprocatory member, said arm carrying a cam track inclined toward said reciprocatory member and in wiping contact therewith, and power means for moving said member.

40. In a device of the character described, a bucket carrying arm, a part carried by said arm and having a cam surface, a reciprocating member having a portion cooperating with said cam surface, and power means for operating said reciprocating member for moving said arm.

41. In a device of the character described, a power actuated element, a bucket carrier provided with cam means cooperating with said power actuated element, and means whereby said element moves the bucket carrier during only a part of its movement.

42. In a device of the character described, a power actuated element, a bucket, a bucket carrier provided with cam means cooperating with said power actuated element, means whereby said element moves the bucket carrier during only a part of its movement, and other means for moving the bucket carrier during the remainder of its movement.

43. In a device of the character described, a power actuated element, a bucket, a bucket carrier provided with cam means cooperating with said power actuated element, means whereby said element moves the bucket carrier during only a part of its movement, other means for moving the bucket carrier during the remainder of its movement, and means for returning said bucket carrier.

44. In a device of the character described, a bucket, cam means to move said bucket from an initial position, and other means to move said bucket to its final position.

45. In a device of the character described, a bucket, cam means to move said bucket from an initial position, other means to move said bucket to its final position, and means to return said bucket to its initial position.

46. In a device of the character described. a bucket, cam means to move said bucket from an initial position, and other means to move said bucket to its final position and back to its initial position.

47. In a device of the character described, a bucket, cam means to move said bucket from an initial position, other means to move said bucket to its final position, and power mechanism for operating such means for moving said bucket.

48. In a device of the character described, a bucket, cam means to move said bucket from an initial position, other means to move said bucket to its final position, means to return said bucket to its initial position, and power mechanism for operating such means for moving said bucket.

49. In a device of the character described, a bucket, cam means to move said bucket from an initial position, other means to move said bucket to its final position and back to its initial position, and power mechanism for operating such means for moving said bucket.

50. In a device of the character described, a bucket, cam means to move said bucket from an initial position, other means to move said bucket to its final position, power mechanism for operating such means for moving said bucket, and means normally biasing said mechanism to move said bucket to its initial position.

51. In a device of the character described, a bucket, cam means to move said bucket from an initial position, other means to move said bucket to its final position, means to return said bucket to its initial position, power mechanism for operating such means for moving said bucket, and means normally biasing said mechanism to move said bucket to its initial position.

52. In a device of the character described, a bucket, cam means to move said bucket from an initial position, other means to move said bucket to its final position and back to its initial position, power mechanism for operating such means for moving said bucket, and means normally biasing said mechanism to move said bucket to its initial position.

53. In a device of the character described, a bucket, an arm connected to said bucket, a portion having a cam surface carried by said arm, a rack, a cam follower, a gear cooperating with said rack and connected to said arm, and means for moving said arm from an initial position by said cam follower and back to said initial position by said rack.

54. In a device of the character described, a bucket, an arm connected to said bucket, a portion having a cam surface carried by said arm, a rack, a cam follower, a gear cooperating with said rack and connected to said arm, and means for moving said arm from an initial position by said cam follower and to a final position by said rack.

55. In a device of the character described; a bucket; an arm connected to said bucket; a portion having a cam surface carried by said arm; a rack; a cam follower; a gear cooperating with said rack and connected to said arm; and means for moving said arm from an initial position by said cam follower, to a final position by said rack, and back to its initial position by said rack.

56. In a device of the character described, a bucket, an arm connected to said bucket, a portion having a cam surface carried by said arm, a rack, a cam follower, a gear cooperating with said rack and connected to said arm; means for moving said arm from an initial position by said cam follower and back to said initial position by said rack, and power mechanism normally biased to move said bucket to its initial position for operating such bucket moving means.

57. In a device of the character described, a bucket, an arm connected to said bucket, a portion having a cam surface carried by said arm, a rack, a cam follower, a gear cooperating with said rack and connected to said arm, means for moving said arm from an initial position by said cam follower and to a final position by said rack, and power mechanism normally biased to move said bucket to its initial position for operating such bucket moving means.

58. In a device of the character described; a bucket; an arm connected to said bucket; a portion having a cam surface carried by said arm; a rack; a cam follower; a gear cooperating with said rack and connected to said arm; means for moving said arm from an initial position by said cam follower, to a final position by said rack, and back to its initial position by said rack; and power mechanism normally biased to move said bucket to its initial position for operating such bucket moving means.

59. In a device of the character described, a ram having a piston member and a cylinder member, a rack adapted to be moved by one of said members, a geared member driven by said rack, cam mechanism driven by the same member as said rack, and a bucket operating mechanism operatively connected to and to be moved by said geared member and said cam mechanism.

60. In a device of the character described, a ram having a piston member and a cylinder member, a rack adapted to be moved by one of said members, a geared member driven by said rack, cam mechanism driven by the same member as said rack, a bucket operating mechanism operatively connected to said geared member and said cam mechanism, whereby said bucket is moved from an initial position by said cam mechanism and to a final position by said geared member.

61. In a device of the character described; a ram having a piston member and a cylinder member; a rack adapted to be moved by one of said members; a geared member driven by said rack; cam mechanism driven by the same member as said rack; a bucket operating mechanism operatively connected to said geared member and said cam mechanism; whereby said bucket is moved from an initial position by said cam mechanism, to a final position by said geared member, and back to said initial position by said geared member.

62. In a device of the character described, a pivoted bucket arm, a gear for turning said arm on its pivot, a rack cooperating with said gear, a roller carried by said rack and resting against said bucket arm, and said bucket arm being formed to provide a track for said roller.

63. In a device of the character described, a ram having a piston member and a cylinder member, a rack adapted to be moved by one of said members. a geared member driven by said rack, cam mechanism driven by the same member as the rack, a bucket operating mechanism operatively connected to and to be moved by said geared member and said cam mechanism, and means normally biasing the movable one of said ram members to a predetermined position.

64. In a device of the character described, a ram having a piston member and a cylinder member, a rack adapted to be moved by one of said members, a geared member driven by said rack, cam mechanism driven by the same member as the rack, a bucket operating mechanism operatively connected to said geared member and said cam mechanism, whereby said bucket is moved from an initial position by said cam mechanism and to a final position by said geared member, and means normally biasing the movable one of said ram members to a predetermined position.

65. In a device of the character described; a ram having a piston member and a cylinder member; a rack adapted to be moved by one of said members; a geared member driven by said rack; cam mechanism driven by the same member as the rack; a bucket operating mechanism operatively connected to said geared member and said cam mechanism; whereby said bucket is moved from an initial position by said cam mechanism, to a final position by said geared member and back to said initial position by said geared member; and means normally biasing the movable one of said ram members to a predetermined position.

66. In a device of the character described, a ram having a piston member and a cylinder member, a rack adapted to be moved by one of said members, a geared member driven by said rack, cam mechanism driven by the same member as the rack, a bucket operating mechanism operatively connected to and to be moved by said geared member and said cam mechanism, and means normally admitting fluid pressure to one end of said cylinder member.

67. In a device of the character described, a ram having a piston member and a cylinder member, a rack adapted to be moved by one of said members, a geared member driven by said rack, cam mechanism driven by the same member as the rack, a bucket operating mechanism operatively connected to said geared member and said cam mechanism, whereby said bucket is moved from an initial position by said cam mechanism and to a final position by said geared member, and means normally admitting fluid pressure to one end of said cylinder member.

68. In a device of the character described; a ram having a piston member and a cylinder member; a rack adapted to be moved by one of said members; a geared member driven by said rack, cam mechanism driven by the same member as the rack; a bucket operating mechanism operatively connected to said geared member and said cam mechanism; whereby said bucket is moved from an initial position by said cam mechanism, to a final position by said geared member and back to said initial position by said geared member; and means normally admitting fluid pressure to one end of said cylinder member.

69. In a device of the character described, the combination of a bucket, a bucket carrying arm, and a plurality of arm actuating means each augmenting the force of the other when lifting said bucket.

70. In a device of the character described, the combination of a bucket, a bucket carrying arm, and a plurality of arm actuating means operating on said arm at different points in its length and each augmenting the force of the other when lifting said bucket.

71. In a device of the character described. the combination of a bucket, a fulcrumed bucket carrying arm, and a plurality of arm actuating means operating on said arm at different distances from the fulcrum.

72. In a device of the character described, a bucket, a bucket arm, a plurality of arm actuating means, means for causing all of said actuating means to operate simultaneously on said arm each augmenting the force of the other for one portion of the movement of said arm, and means for causing less than all of them to operate on said arm for another portion of its movement.

73. In a device of the character described, a bucket, a bucket arm, a plurality of arm actuating means, means for causing all of said actuating means to operate simultaneously on said arm each augmenting the force of the other for one portion of the movement of said arm, means for causing less than all of them to operate on said arm for another portion of its movement, and rams for operating said arm actuating means.

74. In a device of the character described, a bucket, a bucket carrying arm, a plurality of rams each having a movable member operating on said arm for actuating the same, means causing all of said rams to act simultaneously each augmenting the force of the other for moving said arm from an initial position, means causing less than all of said plurality of rams to move said arm to a final position and to return said arm to said initial position.

75. In a device of the character described, a bucket, a fulcrumed bucket carrying arm, a plurality of rams having movable members acting on said arm at different distances from its fulcrum, means for causing all of said members to act simultaneously for moving said arm from an initial position, and means for subsequently eliminating the action on the arm of a ram relatively remote from said fulcrum.

76. In a device of the character described, a bucket, a fulcrumed bucket carrying arm, a plurality of rams having movable members acting on said arm at different distances from its fulcrum, means for causing all of said members to act simultaneously for moving said arm from an initial position, means for subsequently eliminating the action on the arm of a ram relatively remote from said fulcrum, and means for moving said arm to a final position by a ram acting on said arm relatively nearer said fulcrum.

77. In a device of the character described, a bucket, a fulcrumed bucket carrying arm, a plurality of rams having movable members acting on said arm at different distances from its fulcrum, means for causing all of said members to act simultaneously for moving said arm from an initial position, means for subsequently eliminating the action on the arm of a ram relatively remote from said fulcrum, and means for moving said arm to a final position and returning it to said initial position by a ram acting on said arm relatively nearer said fulcrum.

78. In a device of the character described, a bucket, a fulcrumed bucket carrying arm, a plurality of rams having movable members acting on said arm at different distances from its fulcrum, means for causing all of said members to act simultaneously to move said arm from an initial position, means for subsequently eliminating the action on said arm of one of said rams, means for moving said arm to a final position and to said initial position by another of said rams, and means other than said arm or last mentioned ram for returning said first mentioned ram to its initial position prior to the return of said arm.

79. In a device of the character described, a swinging bucket arm, a gear for swinging said arm, a rack for turning said gear, means causing said gear and rack to swing said arm, and means acting on said arm to push it in the direction of swinging.

80. In a device of the character described, a swinging bucket arm, a gear for turning said arm, a rack for turning said gear, and a pair of separate means acting on said arm at different distances from its point of support and in such direction as to cause said arm to swing.

81. In a device of the character described, a swinging bucket arm, a gear and a cooperating rack for turning said arm, a pair of separate means acting on said arm at different distances from its point of support and in such direction as to cause said arm to swing, and cam tracks on said arm for cooperation with said separate means.

82. In a device of the character described, a swinging bucket arm, a gear for swinging said arm, a rack for operating said gear, a ram for operating said rack, a cam surface on said arm, a cam follower operated by said rack, and said cam surface being constructed to cause said cam follower and said rack to impart like simultaneous movement to said arm.

83. In a device of the character described, the combination of a bucket, a bucket carrying arm, and a plurality of rams acting on said arm at different points in its length and each augmenting the force of the other.

84. In a device of the character described, a bucket, a movable bucket operating mechanism, a ram operating on said mechanism relatively near said bucket, a ram operating on said mechanism relatively remote from said bucket, and means for coordinately controlling said rams.

85. In a device of the character described, a bucket, a movable bucket operating mechanism, a ram operating on said mechanism relatively near said bucket, a ram operating on said mechanism relatively remote from said bucket, and means normally biasing one or the other of said rams to a predetermined position.

86. In a device of the character described, a bucket, a movable bucket operating mechanism, a ram operating on said mechanism relatively near said bucket, a ram operating on said mechanism relatively remote from said bucket, means normally biasing one or the other of said rams to a predetermined position, and coordinated controlling means for actuating said rams.

87. In a device of the character described, a bucket swinging mechanism, a bucket connected thereto for limited relative movement, fluid pressure means for causing such movement, fluid pressure means for operating said bucket swinging mechanism, and coordinated controlling means for simultaneously operating both of said fluid pressure means.

88. In a device of the character described, a bucket swinging mechanism, a bucket connected thereto for limited relative movement, fluid pressure means for causing such movement, fluid pressure means for operating said bucket swinging mechanism, and coordinated controlling means for simultaneously operating both of said fluid pressure means or one to the exclusion of the other.

89. In a device of the character described, a bucket swinging mechanism, a bucket connected thereto for limited relative movement, fluid pressure means for causing such movement, fluid pressure means for operating said bucket swinging mechanism, and coordinated controlling means for simultaneously operating both of said fluid pressure means or either to the exclusion of the other.

90. In a device of the character described, a bucket swinging mechanism, a bucket connected thereto for limited relative movement, a ram carried by said mechanism and connected for giving said bucket its limited movement, a ram for swinging said bucket, and coordinated controlling means for said rams.

91. In a device of the character described, fluid pressure means for swinging a bucket, fluid pressure means for shaking said bucket, a valve for controlling the first mentioned means, and a second valve movable with the first and for controlling said second mentioned fluid pressure means.

92. In a device of the character described, material handling mechanism, a plurality of motor devices for imparting operative effects to said mechanism, a source of motive energy, a movable controller for the supply of energy transmitted from said source to said motors and having relatively movable parts, and energy transmitting connections whereby in any position of said controller one of said motors may be controlled by such relative movement.

93. In a device of the character described, material handling mechanism, a plurality of motor devices for imparting operative effects to said mechanism, a source of motive energy, a movable controller for the supply of energy transmitted from said source to said motors and having relatively movable parts, and energy transmitting connections whereby one motor may be controlled independently of another by such relative movement.

94. In a device of the character described, material handling mechanism, a plurality of fluid pressure devices for imparting operative effects to said mechanism, a source of motive fluid supply, a valvular mechanism for controlling the motive fluid for said devices and having a relatively movable valvular part, and conduit means whereby in any position of said valvular mechanism one motor may be controlled by said relatively movable part.

95. In a device of the character described, material handling mechanism, a plurality of fluid pressure devices for imparting operative effects to said mechanism, a source of motive fluid supply, a valvular mechanism for controlling the motive fluid for said devices and having a relatively movable valvular part, and conduit means whereby one motor may be controlled independently of another by said relatively movable part.

96. In a device of the character described, material handling mechanism, a plurality of motor devices for imparting operative effects to said mechanism, a source of motive energy, a movable controller for the supply of energy transmitted from said source to said motors and having relatively movable parts, and energy transmitting connections whereby one motor may be controlled by bodily moving said controller and another motor be controlled by such relative movement.

97. In a device of the character described, material handling mechanism, a plurality of fluid pressure devices for imparting operative effects to said mechanism, a source of motive fluid supply, a valvular mechanism for controlling the motive fluid for said devices and having a relatively movable valvular part, and conduit means whereby one motor may be controlled by movement of said valvular mechanism and another be controlled by said relative movement.

98. In a device of the character described, a bucket, a plurality of fluid pressure means for moving said bucket relatively to material to be handled thereby, motive fluid connections for conducting motive fluid used in said fluid pressure means, and valvular mechanism for controlling certain of said connections having a relatively movable part controlling other of said connections, whereby one of said motors may be controlled by bodily moving said valvular mechanism and another of said motors be controlled by independent movement of said relatively movable part.

99. In a device of the character described, a bucket, fluid pressure means for moving said bucket relatively to the material to be handled thereby, fluid pressure means for shaking said bucket, motive fluid connections for conducting motive fluid used in said fluid pressure means, a valve for controlling the connections for one of said fluid pressure means, said valve having a part movable therewith and relatively thereto and controlling the connections for the other of said fluid pressure means by such relative movement.

100. In a device of the character described, material handling mechanism, a plurality of motion imparting means for operating said mechanism, a source of motive energy for said means, a movable controller mechanism for the energy of said source impressed on said means; and unitary means for moving said controller mechanism said unitary means being responsive to motion of the operator for controlling the impression of energy on one of said motion imparting means, and said unitary means being further responsive to an independent motion of the operator for controlling the impression of energy on another of said motion imparting means.

101. In a device of the character described, material handling mechanism, a plurality of motion imparting means for operating said mechanism, a source of motive energy for said means, a movable controller mechanism for the energy of said source impressed on said means, and a handle mechanism for moving said controller mechanism responsive to motion of the operator for controlling the impression of energy on one of said motion imparting means and responsive to an independent motion of the operator for controlling the impression of energy on another of said motion imparting means.

102. In a device of the character described, material handling mechanism, a plurality of motion imparting means for operating said mechanism, a source of motive energy for said means, a movable controller mechanism for the energy of said source impressed on said means, and a unitary device responsive to a motion of the operator for moving said controller mechanism to a plurality of positions to control the impression of energy on one of said motion imparting means and responsive to an independent motion of said operator to control the impression of energy on another of said motion imparting means in all of said positions.

103. In a device of the character described, material handling mechanism, a plurality of fluid motors for operating said mechanism, a valve for controlling one or more of said motors, and a second valve carried by said first mentioned valve for controlling another of said motors.

104. In a device of the character described, material handling mechanism, a plurality of fluid motors for operating said mechanism, a valve for controlling one or more of said motors, a second valve carried by the first mentioned valve, means responsive to motion of the operator for moving said first mentioned valve, and means for moving said second valve cooperating with the first mentioned means.

105. In a device of the character described, material handling mechanism, a plurality of fluid motors for operating said mechanism, a valve for controlling one or more of said motors, a second valve carried by said first mentioned valve for controlling another of said motors, and operative in a plurality of positions of said first mentioned valve.

106. In a device of the character described, material handling mechanism, a plurality of fluid motors for operating said mechanism, a valve for controlling one or more of said motors, a second valve carried by said first valve, means responsive to motion of the operator for moving the first mentioned valve to a plurality of positions, and means for moving said second valve cooperating with the first mentioned means and operative in all of said positions.

107. In a device of the character described, a bucket, a bucket arm, a plurality of rams for swinging said bucket arm, and other means for moving said bucket towards the material to be handled.

108. In a device of the character described, a bucket, a bucket arm, a plurality of rams for swinging said bucket arm, and a ram substantially aligned with one of said first mentioned rams for moving said bucket towards the material to be handled.

109. In a device of the character described, a bucket, a bucket arm, a plurality of rams for swinging said bucket arm, and a ram for moving said first mentioned rams and bucket towards the material to be handled.

110. In a device of the character described, a bucket, a bucket arm, a plurality of rams for swinging said bucket arm, and a ram substantially aligned with one of said first mentioned rams for moving the latter and said bucket towards the material to be handled.

111. In a device of the character described, a bucket, a bucket arm, a ram for forcing said bucket into the material to be handled and a second ram for moving said first mentioned ram and bucket towards the material to be handled.

112. In a device of the character described, a bucket, a bucket arm, a ram for forcing said bucket into the material to be handled and a second ram substantially aligned with said first mentioned ram for moving said first mentioned ram and bucket towards the material to be handled.

113. In a device of the character described, a bucket, a bucket arm, a plurality of rams for swinging said bucket arm, other means for moving said bucket towards the material to be handled, and independent motor means for shaking said bucket.

114. In a device of the character described, a bucket, a bucket arm, a plurality of rams for swinging said bucket arm, a ram substantially aligned with one of said first mentioned rams for moving said bucket towards the material to be handled, and independent motor means for shaking said bucket.

115. In a device of the character described, a bucket, a bucket arm, a plurality of rams for swinging said bucket arm, a ram for moving said first mentioned rams and bucket towards the material to be handled, and independent motor means for shaking said bucket.

116. In a device of the character described, a bucket, a bucket arm, a plurality of rams for swinging said bucket arm, a ram substantially aligned with one of said first mentioned rams for moving the latter and said bucket towards the material to be handled, and independent motor means for shaking said bucket.

117. In a device of the character described, a bucket, a bucket arm, a ram for forcing said bucket into the material to be handled, a second ram for moving said first mentioned ram and bucket towards the material to be handled, and independent motor means for shaking said bucket.

118. In a device of the character described, a bucket, a bucket arm, a ram for forcing said bucket into the material to be handled, a second ram substantially aligned with said first mentioned ram for moving said first mentioned ram and bucket towards the material to be handled, and independent motor means for shaking said bucket.

119. In a device of the character described, a truck, a relatively movable table mounted thereon, a relatively movable carriage mounted on said table, shoveling mechanism including a swinging shovel carried by said carriage, and means including a reciprocating ram on said carriage for swinging said shovel.

120. In a device of the character described, a truck, a relatively swinging table mounted thereon, a relatively movable carriage mounted on said table, shoveling mechanism including a swinging shovel carried by said carriage, and means including a reciprocating ram on said carriage for swinging said shovel.

121. In a device of the character described, a truck, a relatively movable table mounted thereon, a relatively movable carriage mounted on said table, a hopper, and a swinging shovel for raising material to said hopper and carried by said carriage.

122. In a device of the character described, a truck, a relatively movable table mounted thereon, a hopper carried by said table, means for raising material to said hopper and at will discharging it therefrom, and means for moving said table.

123. In a device of the character described, a hopper, material handling mechanism for filling said hopper, a movable table supporting said hopper and mechanism, and motor mechanism for dumping said hopper.

124. In a device of the character described, a hopper, material handling mechanism for filling said hopper, motor mechanism for dumping said hopper, and a movable table supporting said hopper and said mechanism.

125. A device of the character described having, in combination, a truck, a transversely swinging table on said truck, a carriage on said table mounted for reciprocating movement lengthwise of said truck, a bucket, and an arm carrying said bucket, said arm mounted on said carriage for swinging movement in vertical planes for raising and dumping said bucket independently of motion of said carriage.

126. In a device of the character described, a truck, a transversely swinging table on said truck, a carriage on said table, a swinging shovel carried by said carriage, a hopper carried by said table, means for reciprocating said carriage for crowding said shovel into the work and for positioning said shovel in alignment with said hopper, and means for swinging said shovel for raising and delivering material to said hopper.

127. In a device of the character described, a truck, a transversely swinging table on said truck, a carriage on said table, a swinging shovel carried by said carriage, a hopper carried by said table, means for reciprocating said carriage for crowding said shovel into the work and for positioning said shovel in alignment with said hopper, means for swinging said shovel for raising and delivering material to said hopper, and means for discharging the contents of said hopper to the rear of said truck.

128. In a device of the character described, a truck, a transversely swinging table on said truck, a carriage on said table, a swinging shovel carried by said carriage, a hopper carried by said table, means for reciprocating said carriage for crowding said shovel into the work and for positioning said shovel in alignment with said hopper, means for swinging said shovel for raising and delivering material to said hopper, and means for tilting said hopper for discharging its contents.

129. In a device of the character described, a hopper, material handling mechanism for conveying material to said hopper, means for tilting said hopper comprising motor mechanism normally biasing said hopper to a predetermined position.

130. In a device of the character described, material handling mechanism, a plurality of fluid pressure devices for controlling the operation of said mechanism, conduit means providing a plurality of valve seats, valves for said devices cooperating with said valve seats and arranged in contiguous relation and means for operating said valves.

131. In a device of the character described, material handling mechanism, a plurality of fluid pressure devices for controlling the operation of said mechanism, conduit means providing a plurality of valve seats, valves for said devices cooperating said said valve seats and arranged in contiguous relation, means for operating said valves, and means for biasing one or more of said valves to a predetermined position.

132. In a device of the character described, material handling mechanism, a plurality of fluid pressure devices for controlling the operation of said mechanism, conduit means providing a plurality of valve seats, valves for said devices cooperating with said valve seats, and operating members for said valves arranged in contiguous relation.

133. In a device of the character described, material handling mechanism, a plurality of fluid pressure devices for controlling the operation of said mechanism, a member providing a plurality of valve seats, a source of motive fluid supply common to each of said seats, valves cooperating with said seats, conduit means formed in said member and connecting said fluid pressure devices with said seats, and ports controlled by said valves for establishing communication between said conduits and said source.

134. In a device of the character described, material handling mechanism, a plurality of fluid pressure devices for controlling the operation of said mechanism, a member providing seats for a plurality of valves, valves cooperating with said seats, conduit means establishing communication between said seats and said devices, conduit means establishing communication between said seats seats and said devices, conduit means establishing communication between said seats and a common motive fluid supply conduit, and ports formed in said valves for establishing communication between the first mentioned conduit means and one or the other of the second and third mentioned conduit means.

135. In a device of the character described, material handling mechanism, a plurality of fluid pressure devices for controlling the operation of said mechanism, a member providing arcular valve seats on the exterior thereof, oscillatory valves carried on said seats in contiguous relation, and conduit means controlled by said valves for operating said devices.

136. A shoveling machine, having in combination, a shovel, an arm supporting said shovel, fluid pressure actuated means for moving said arm, said means comprising a pair of coaxially arranged piston members and a cylinder member for said piston members, means for admitting pressure fluid to said cylinder member for moving two of said members simultaneously for crowding said shovel into the work, and means for moving one of said two members relatively to the other for raising said shovel.

137. A shoveling machine, having in combination, a shovel, an arm supporting said shovel, fluid pressure actuated means for moving said arm, said means comprising a pair of coaxially arranged piston members and a cylinder member for said piston members, means for admitting pressure fluid to said cylinder member for at will moving two of said members simultaneously relatively to the third or for causing one of said two to move relatively to the other.

138. A shoveling machine, having in combination, a shovel, an arm supporting said shovel, fluid pressure actuated means for moving said arm, said means comprising a pair of coaxially arranged piston members and a cylinder member for said piston members, means for admitting pressure fluid to said cylinder member for at will moving two of said members simultaneously relatively to the third or for causing said two to move relatively to each other and to said third.

In testimony whereof, I have signed my name to this specification.

GEORGE H. GILMAN.

conveying material to said hopper, means for tilting said hopper comprising motor mechanism normally biasing said hopper to a predetermined position.

130. In a device of the character described, material handling mechanism, a plurality of fluid pressure devices for controlling the operation of said mechanism, conduit means providing a plurality of valve seats, valves for said devices cooperating with said valve seats and arranged in contiguous relation and means for operating said valves.

131. In a device of the character described, material handling mechanism, a plurality of fluid pressure devices for controlling the operation of said mechanism, conduit means providing a plurality of valve seats, valves for said devices cooperating said said valve seats and arranged in contiguous relation, means for operating said valves, and means for biasing one or more of said valves to a predetermined position.

132. In a device of the character described, material handling mechanism, a plurality of fluid pressure devices for controlling the operation of said mechanism, conduit means providing a plurality of valve seats, valves for said devices cooperating with said valve seats, and operating members for said valves arranged in contiguous relation.

133. In a device of the character described, material handling mechanism, a plurality of fluid pressure devices for controlling the operation of said mechanism, a member providing a plurality of valve seats, a source of motive fluid supply common to each of said seats, valves cooperating with said seats, conduit means formed in said member and connecting said fluid pressure devices with said seats, and ports controlled by said valves for establishing communication between said conduits and said source.

134. In a device of the character described, material handling mechanism, a plurality of fluid pressure devices for controlling the operation of said mechanism, a member providing seats for a plurality of valves, valves cooperating with said seats, conduit means establishing communication between said seats and said devices, conduit means establishing communication between said seats seats and said devices, conduit means establishing communication between said seats and a common motive fluid supply conduit, and ports formed in said valves for establishing communication between the first mentioned conduit means and one or the other of the second and third mentioned conduit means.

135. In a device of the character described, material handling mechanism, a plurality of fluid pressure devices for controlling the operation of said mechanism, a member providing arcular valve seats on the exterior thereof, oscillatory valves carried on said seats in contiguous relation, and conduit means controlled by said valves for operating said devices.

136. A shoveling machine, having in combination, a shovel, an arm supporting said shovel, fluid pressure actuated means for moving said arm, said means comprising a pair of coaxially arranged piston members and a cylinder member for said piston members, means for admitting pressure fluid to said cylinder member for moving two of said members simultaneously for crowding said shovel into the work, and means for moving one of said two members relatively to the other for raising said shovel.

137. A shoveling machine, having in combination, a shovel, an arm supporting said shovel, fluid pressure actuated means for moving said arm, said means comprising a pair of coaxially arranged piston members and a cylinder member for said piston members, means for admitting pressure fluid to said cylinder member for at will moving two of said members simultaneously relatively to the third or for causing one of said two to move relatively to the other.

138. A shoveling machine, having in combination, a shovel, an arm supporting said shovel, fluid pressure actuated means for moving said arm, said means comprising a pair of coaxially arranged piston members and a cylinder member for said piston members, means for admitting pressure fluid to said cylinder member for at will moving two of said members simultaneously relatively to the third or for causing said two to move relatively to each other and to said third.

In testimony whereof, I have signed my name to this specification.

GEORGE H. GILMAN.

---

Certificate of Correction.

Patent No. 1,614,787.    Granted January 18, 1927, to
GEORGE H. GILMAN.

It is hereby certified that error appears in the printed specification of the above-mentioned patent requiring correction as follows: Page 18, line 52, claim 134, strike out the words "seats and said devices" and insert instead *and the atmosphere;* and that the said Letters Patent should be read with this correction therein that the same may conform to the record of the case in the Patent Office.

Signed and sealed this 8th day of March, A. D. 1927.

[SEAL.]

M. J. MOORE,
*Acting Commissioner of Patents.*

Certificate of Correction.

Patent No. 1,614,787.　　　　　　　　　　　Granted January 18, 1927, to

GEORGE H. GILMAN.

It is hereby certified that error appears in the printed specification of the above-mentioned patent requiring correction as follows: Page 18, line 52, claim 134, strike out the words "seats and said devices" and insert instead *and the atmosphere;* and that the said Letters Patent should be read with this correction therein that the same may conform to the record of the case in the Patent Office.

Signed and sealed this 8th day of March, A. D. 1927.

[SEAL.]

M. J. MOORE,
*Acting Commissioner of Patents.*